United States Patent
Mihara et al.

(10) Patent No.: US 9,472,094 B2
(45) Date of Patent: Oct. 18, 2016

(54) DISPLAY DEVICE, EYEGLASS DEVICE AND IMAGE SYSTEM

(75) Inventors: Kazuhiro Mihara, Osaka (JP); Hiroshi Mitani, Osaka (JP); Shuji Inoue, Osaka (JP); Masanobu Inoe, Osaka (JP); Katsuo Saigo, Hyogo (JP); Seiji Nakazawa, Osaka (JP)

(73) Assignee: PANASONIC INTELLECTUAL PROPERTY MANGEMENT CO., LTD., Osaka (JP)

(*) Notice: Subject to any disclaimer, the term of this patent is extended or adjusted under 35 U.S.C. 154(b) by 598 days.

(21) Appl. No.: 13/398,138

(22) Filed: Feb. 16, 2012

(65) Prior Publication Data

US 2012/0154371 A1 Jun. 21, 2012

Related U.S. Application Data

(63) Continuation of application No. PCT/JP2011/000768, filed on Feb. 10, 2011.

(30) Foreign Application Priority Data

Feb. 12, 2010 (JP) ................................. 2010-028491

(51) Int. Cl.
*H04N 13/04* (2006.01)
*G08C 19/16* (2006.01)

(52) U.S. Cl.
CPC .......... *G08C 19/16* (2013.01); *H04N 13/0438* (2013.01)

(58) Field of Classification Search
CPC ............................ H04N 13/0438; G08C 19/16

USPC ............................................. 348/56
See application file for complete search history.

(56) References Cited

U.S. PATENT DOCUMENTS 5,821,989 A * 10/1998 Lazzaro et al. ................. 348/56
6,456,432 B1  9/2002 Lazzaro et al.
(Continued)

FOREIGN PATENT DOCUMENTS

| JP | 62-276989 | 12/1987 |
| JP | 63-1286 | 1/1988 |
| JP | 63-33285 | 3/1988 |

(Continued)

OTHER PUBLICATIONS

International Search Report issued Apr. 26, 2011 in International (PCT) Application No. PCT/JP2011/000768.

*Primary Examiner* — Jamie Atala
*Assistant Examiner* — Nguyen Truong
(74) *Attorney, Agent, or Firm* — Wenderoth, Lind & Ponack, L.L.P.

(57) ABSTRACT

A display device includes a display portion for displaying a video, a generator for generating a synchronization signal including a command signal synchronized with display of frame images of the video and a transmitter for transmitting the synchronization signal. The command signal including a predetermined member of pulse signals has a leading pulse signal for notifying a start of the command signal, a terminal pulse signal for notifying an end of the command signal and a control pulse signal for notifying a content of synchronization control synchronized with the display of the frame images.

11 Claims, 12 Drawing Sheets

(56) References Cited

U.S. PATENT DOCUMENTS

| | | |
|---|---|---|
| 6,687,399 B1 | 2/2004 | Chuang et al. |
| 6,791,599 B1 | 9/2004 | Okada et al. |
| 2001/0043266 A1 | 11/2001 | Robinson et al. |
| 2008/0151112 A1 | 6/2008 | Basile et al. |
| 2009/0237327 A1 | 9/2009 | Park et al. |

FOREIGN PATENT DOCUMENTS

| | | |
|---|---|---|
| JP | 5-3585 | 1/1993 |
| JP | 8-79799 | 3/1996 |
| JP | 8-265863 | 10/1996 |
| JP | 11-98538 | 4/1999 |
| JP | 2002-369273 | 12/2002 |

* cited by examiner

FIG. 8

| ID | COMMAND SIGNAL ||||||| 
|---|---|---|---|---|---|---|---|
| | LEADING PULSE | CONTROL PULSE ||||| TERMINAL PULSE |
| | 1 (START) | 2 | 3 | 4 | 5 | 6 | 7 (END) |
| 1 | ON | ON | ON | | | | ON |
| 2 | ON | ON | | ON | | | ON |
| 3 | ON | ON | | | ON | | ON |
| 4 | ON | ON | | | | ON | ON |
| 5 | ON | | ON | ON | | | ON |
| 6 | ON | | ON | | ON | | ON |
| 7 | ON | | ON | | | ON | ON |
| 8 | ON | | | ON | ON | | ON |
| 9 | ON | | | ON | | ON | ON |
| 10 | ON | | | | ON | ON | ON |

TWO SIGNALS BECOME ON IN FIVE TIME-POSITIONS

FIG. 9

| ID | COMMAND SIGNAL | | | | | | |
|---|---|---|---|---|---|---|---|
| | LEADING PULSE | CONTROL PULSE | | | | | TERMINAL PULSE |
| | 1 (START) | 2 | 3 | 4 | 5 | 6 | 7 (END) |
| 1 | ON | ON | ON | ON | | | ON |
| 2 | ON | ON | ON | | ON | | ON |
| 3 | ON | ON | ON | | | ON | ON |
| 4 | ON | ON | | ON | ON | | ON |
| 5 | ON | ON | | ON | | ON | ON |
| 6 | ON | ON | | | ON | ON | ON |
| 7 | ON | | ON | ON | ON | | ON |
| 8 | ON | | ON | ON | | ON | ON |
| 9 | ON | | ON | | ON | ON | ON |
| 10 | ON | | | ON | ON | ON | ON |

THREE SIGNALS BECOME ON IN FIVE TIME-POSITIONS

FIG. 10

| ID | COMMAND SIGNAL | | | | | |
|---|---|---|---|---|---|---|
| | LEADING PULSE | CONTROL PULSE | | | | TERMINAL PULSE |
| | 1 (START) | 2 | 3 | 4 | 5 | 6 (END) |
| 1 | ON | ON | ON | | | ON |
| 2 | ON | ON | | ON | | ON |
| 3 | ON | ON | | | ON | ON |
| 4 | ON | | ON | ON | | ON |
| 5 | ON | | ON | | ON | ON |
| 6 | ON | | | ON | ON | ON |

TWO SIGNALS BECOME ON IN FOUR TIME-POSITIONS

FIG. 11

| ID | COMMAND SIGNAL | | | | | |
|---|---|---|---|---|---|---|
| | LEADING PULSE | CONTROL PULSE | | | | TERMINAL PULSE |
| | 1 (START) | 2 | 3 | 4 | 5 | 6 (END) |
| 1 | ON | ON | ON | ON | | ON |
| 2 | ON | ON | | ON | ON | ON |
| 3 | ON | | ON | ON | ON | ON |
| 4 | ON | ON | ON | | ON | ON |

THREE SIGNALS BECOME ON IN FOUR TIME-POSITIONS

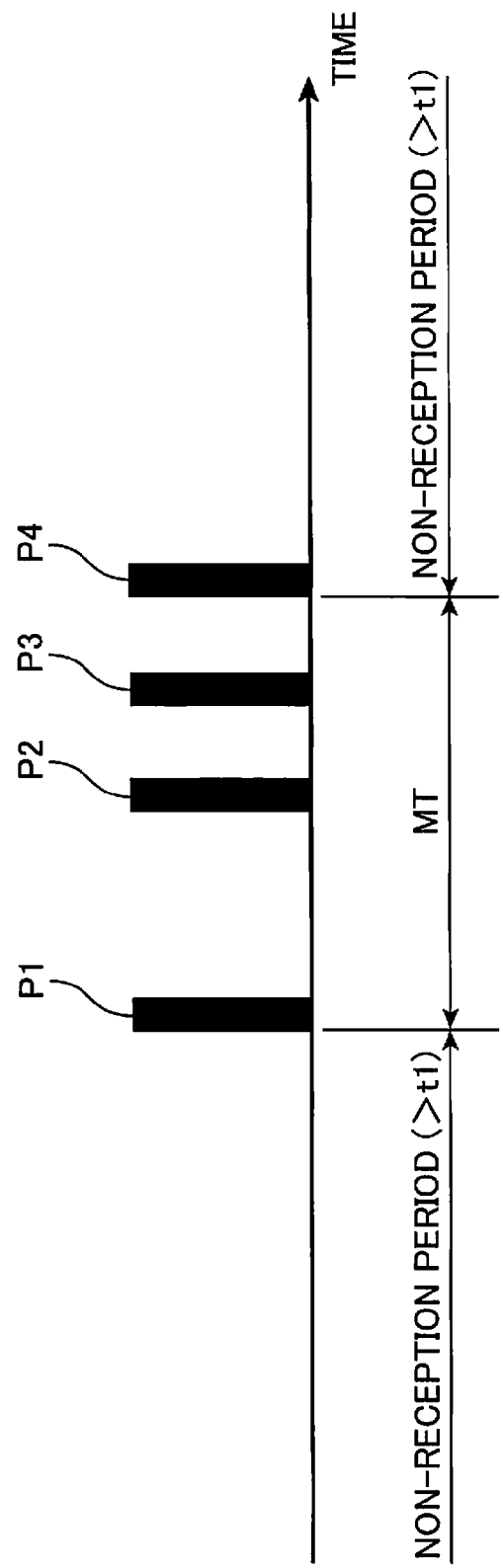

DISPLAY DEVICE, EYEGLASS DEVICE AND IMAGE SYSTEM

This application is a Continuation of International Application No. PCT/JP2011/000768, with the International Filing Date of Feb. 10, 2011.

TECHNICAL FIELD

The present invention is related to technologies to view a video displayed on a display device via an eyeglass device, and more particularly to communication technologies of synchronization signals which are communicated between the display device and the eyeglass device.

BACKGROUND OF THE INVENTION

BACKGROUND ART

An image system for causing a viewer to stereoscopically perceive a video typically includes a display device which alternately switches the display between a left eye image viewed by the left eye and a right eye image viewed by the right eye, and an eyeglass device with optical shutters which open/close in synchronization with the switching of the images. A viewer wearing the eyeglass device may stereoscopically perceive the video displayed by the display device.

Patent Document 1 discloses communication technologies between the display device and the eyeglass device. According to Patent Document 1, a "high signal" and a "low signal" are used for switching polarities of the left and right liquid crystal shutters, which are used as the optical shutters of the eyeglass device. The "high signal" and the "low signal" are alternately generated at a predetermined cycle.

If synchronization signals, which are transmitted from the display device to the eyeglass device to switch operation of the left and right shutters, include a relatively simple "high signal" and "low signal" or include a simply encoded command signal, the eyeglass device potentially malfunctions due to noise signals.

Patent Document 1: Japanese Patent Application Laid-Open No. H11-98538

SUMMARY OF THE INVENTION

It is an object of the present invention to provide technologies to realize highly noise-resistant communication of the synchronization signals transmitted from the display device to the eyeglass device configured to adjust the transmitted light amount, which is transmitted to the left and right eyes, respectively, via the eyeglass device.

A display device according to an aspect of the present invention, comprises a display portion configured to display a video; a generator configured to generate a synchronization signal including a command signal which is synchronized with display of a frame image of the video; and a transmitter configured to transmit the synchronization signal, wherein the command signal includes a predetermined number of pulse signals, and the command signal includes a leading pulse signal for notifying a start of the command signal, a terminal pulse signal for notifying an end of the command signal, and a control pulse signal for notifying a content of synchronization control which is synchronized with the display of the frame image.

An eyeglass device according to another aspect of the present invention comprises: an optical filter portion which adjusts a transmitted light amount to an eye of a viewer in synchronization with display of a frame image of a video to execute an assistance operation for assisting in stereoscopically viewing the video; a receiver configured to receive a synchronization signal for executing the assistance operation which is synchronized with the display of the frame image; an analyzer configured to analyze the synchronization signal; and a controller configured to control the optical filter portion based on an analysis result of the analyzer, wherein the synchronization signal includes a command signal having a predetermined number of pulse signals, and the command signal includes a leading pulse signal for notifying a start of the command signal, a terminal pulse signal for notifying an end of the command signal, and a control pulse signal for notifying a content of the assistance operation which is synchronized with the display of the frame image.

An image system according to yet another aspect of the present invention comprises: a display device configured to alternately switch display of frame images of a video; and an eyeglass device configured to adjust a transmitted light amount to an eye of a viewer in synchronization with the display of the frame images to execute an assistance operation for assisting in stereoscopically viewing the video, wherein the display device includes: a display portion configured to display the video; a generator configured to generate a synchronization signal including a command signal which is synchronized with the display of the frame images of the video; and a transmitter configured to transmit the synchronization signal, the command signal includes a predetermined number of pulse signals, the command signal includes a leading pulse signal for notifying a start of the command signal, a terminal pulse signal for notifying an end of the command signal, and a control pulse signal for notifying a content of the assistance operation which is synchronized with the display of the frame images, and the eyeglass device includes: an optical filter portion configured to execute the assistance operation; a receiver configured to receive the synchronization signal; an analyzer configured to analyze the synchronization signal; and a controller configured to control the optical filter portion based on an analysis result of the analyzer.

BRIEF DESCRIPTION OF THE DRAWINGS

FIG. 8 is a table showing combinations of "ON" and "OFF" of pulse signals in the command signal shown in FIG. 7.

FIG. 9 is a table showing different combinations of "ON" and "OFF" of the pulse signals in the command signal shown in FIG. 7.

FIG. 10 is a table showing different combinations of "ON" and "OFF" of the pulse signals in the command signal shown in FIG. 7.

FIG. 11 is a table showing different combinations of "ON" and "OFF" of the pulse signals in the command signal shown in FIG. 7.

FIG. 13 is a schematic timing chart depicting the pulse signal group received by the receiver of the eyeglass device.

DESCRIPTION OF THE INVENTION

A display device, an eyeglass device and an image system according to one embodiment are described with reference to the accompanying drawings. Configurations, arrangements or shapes and descriptions of the drawings are simply for facilitating to understand principles of the display device, the eyeglass device and the image system, and are not for limiting the principles of the display device, the eyeglass device and the image system in any way.

<Configuration of Image System>

Figure 1:
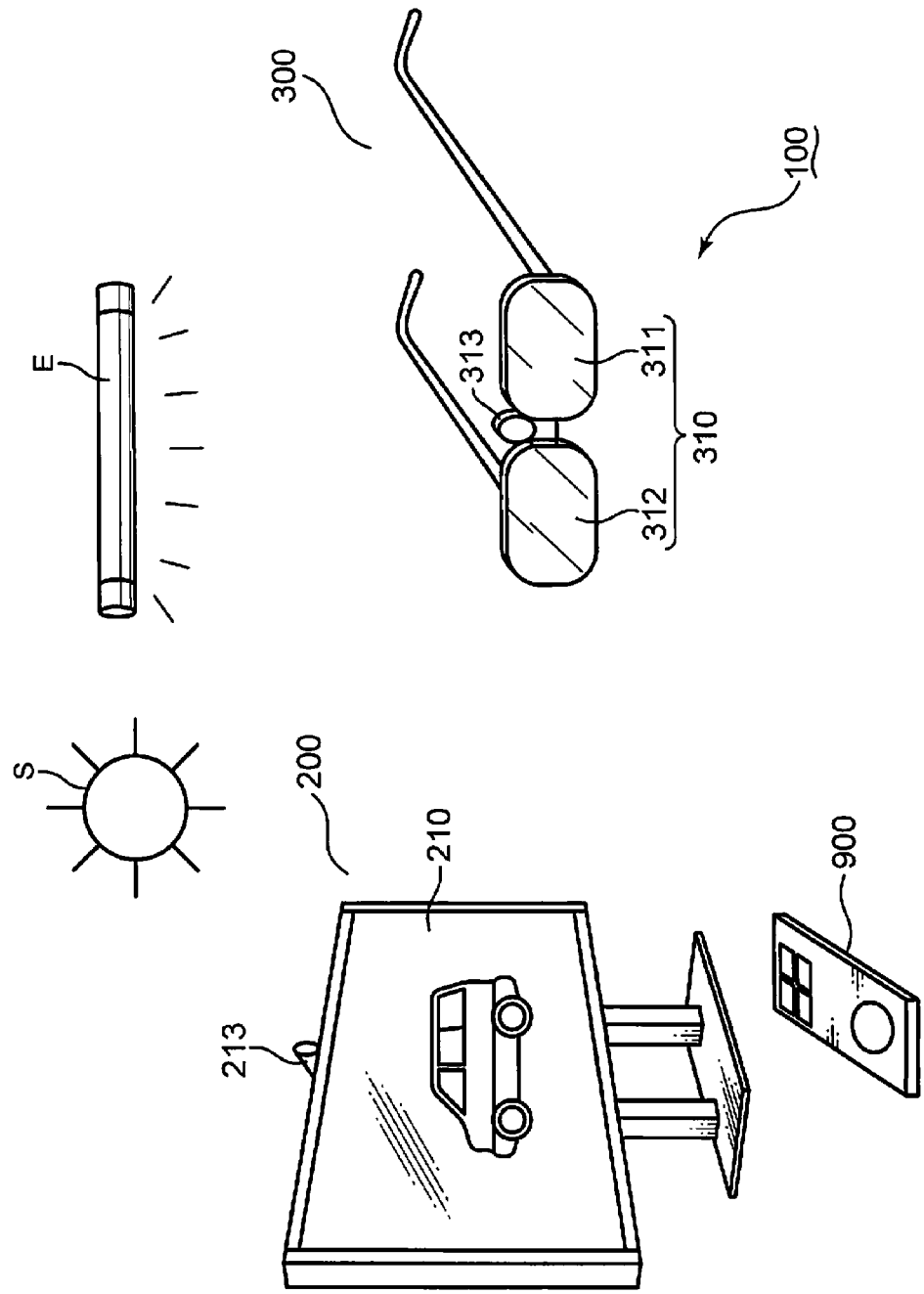
FIG. 1 is a schematic view depicting a configuration of an image system according to one embodiment.

FIG. 1 is a schematic view depicting an image system according to one embodiment. The image system is described with reference to FIG. 1.

The image system 100 includes a display device 200 configured to display a video which is stereoscopically perceived, and an eyeglass device 300 configured to execute an assistance operation for assisting in viewing the video displayed by the display image 200. The display device 200 time-sequentially switches the display of the frame images of the video. The eyeglass device 300 executes the assistance operation to adjust transmitted light amounts to the eyes of a viewer in synchronization with the display of the frame images. If the viewer wears the eyeglass device 300 to view the video displayed by the display device 200, the viewer may stereoscopically perceive the video.

The display device 200 includes a display panel 210 configured to display a video which is stereoscopically perceived. The video displayed on the display panel 210 includes a left eye frame image (hereafter called "L frame image") created to be viewed by the left eye, and a right eye frame image (hereafter called "R frame image") created to be viewed by the right eye. The display device 200 alternately displays the L and R frame images on the display panel 210, for example, at a 120 Hz frequency. In the present embodiment, the display panel 210 is exemplified as the display portion.

The eyeglass device 300 looks like eyeglasses for vision correction. The eyeglass device 300 includes an optical shutter portion 310 which executes the assistance operation for assisting in stereoscopically viewing a video displayed by the display device 200. The optical shutter portion 310 includes a left shutter 311 situated in front of the left eye of the viewer wearing the eyeglass device 300, and a right shutter 312 situated in front of the right eye thereof. The left shutter 311 is opened in synchronization with display of the L frame image whereas the right shutter 312 is closed while the L frame image is displayed. The right shutter 312 is opened in synchronization with display of the R frame image whereas the left shutter 311 is closed while the R frame image is displayed. If the left shutter 311 is opened, an increased amount of light enters the left eye via the left shutter 311. If the left shutter 311 is closed, a decreased amount of light enters the left eye via the left shutter 311. If the right shutter 312 is opened, an increased amount of light enters the right eye via the right shutter 312. If the right shutter 312 is closed, a decreased amount of light enters the right eye via the right shutter 312. In the following descriptions, the amount of light which enters an eye of the viewer via the optical shutter portion 310 is called the "transmitted light amount". In the present embodiment, the optical shutter portion 310 is exemplified as the optical filter portion. The left shutter 311 is exemplified as the left filter. The right shutter 312 is exemplified as the right filter. Other optical elements configured to adjust the transmitted light amount may be used for the left and/or right filters. A deflection element (e.g. liquid crystal filter) for deflecting light which is transmitted to the left and/or right eyes of the viewer may be used for the left and/or right filters.

As a result of the assistance operation by the optical shutter portion 310, the viewer may view the L frame image only by the left eye and the R frame image only by the right eye. The L and R frame images have different contents by an amount of parallax from each other. The viewer perceives pseudo-parallax in the L frame image viewed only by the left eye and the R frame image viewed only by the right eye. As a result, the viewer stereoscopically perceives the video displayed by the display device 200. While the eyeglass device 300 appropriately executes the assistance operation, the viewer may perceive objects in the video as if they is protruded or withdrawn from the display surface of the display panel 210.

Video signals are input to the display device 200. The display device 200 processes the video signals and outputs a stereoscopic image (3D image) to the display panel 210. The display device 200 also includes a light emitter 213, which is used as the transmitter configured to transmit synchronization signals for causing the eyeglass device 300 to execute the aforementioned assistance operation in synchronization with the display of the video. According to the present embodiment, the light emitter 213 emits infrared rays.

The eyeglass device 300 also includes a light receiver 313 which is used as the receiver configured to receive the aforementioned synchronization signals. The light receiver 313 receives the infrared rays emitted by the light emitter 213.

The synchronization signal includes a command signal which is transmitted in synchronization with the display of the L and R frame images. The optical shutter portion 310 executes the assistance operation in synchronization with the display of the L and R frame images in response to the command signal included in the synchronization signal. According to the present embodiment, the light emitter 213 transmits a command signal for opening the left shutter 311 in synchronization with the start of the L frame image display. The light emitter 213 transmits a command signal for closing the left shutter 311 in synchronization with the end of the L frame image display. The light emitter 213 transmits a command signal for opening the right shutter 312 in synchronization with the start of the R frame image display. The light emitter 213 transmits a command signal for closing the right shutter 312 in synchronization with the end of the R frame image display. If the light receiver 313 receives the command signal for opening the left shutter 311, the left shutter 311 is opened in synchronization with the start of the L frame image display. If the light receiver 313 receives the command signal for closing the left shutter 311, the left shutter 311 is closed in synchronization with the end of the L frame image display. If the light receiver 313 receives the command signal for opening the right shutter 312, the right shutter 312 is opened in synchronization with the start of the R frame image display. If the light receiver 313 receives the command signal for closing the right shutter 312, the right shutter 312 is closed in synchronization with the end of the R frame image display. As a result, while the display panel 210 displays the L frame image, an increased amount of the image light is incident on the left eye whereas a decreased amount of the image light is incident on the right eye. While the display panel 210 displays the R frame image, an increased amount of the image light is incident on the right eye whereas a decreased amount of the image light is incident on the left eye.

As a result of the aforementioned assistance operation of the optical shutter portion 310, the viewer wearing the eyeglass device 300 may stereoscopically perceive the video displayed by the display device 200.

According to the present embodiment, a display frequency of the L and R frame images is 120 Hz. Alternatively the display frequency of the L and R frame images may be another value such as 96 Hz, 100 Hz or 144 Hz. It is preferable that the display frequency of the L and R frame images is appropriately set according to a source of a displayed video.

According to the present embodiment, the image system 100 is used in a space illuminated by external light such as sunlight S and/or a fluorescent lamp E. In many cases, the display device 200 is controlled by means of a remote controller 900. The external light such as the sunlight S and the illumination light of the fluorescent lamp E generally contain infrared rays. Infrared signals are typically used for communication between the remote controller 900 and the display device 200.

According to the present embodiment, the light receiver 313 of the eyeglass device 300 receives the infrared signals, which are transmitted from the display device 200 as synchronization signals. Therefore the light receiver 313 potentially receives the infrared rays included in the external light such as the sunlight S and the illumination light of the fluorescent lamp E, and the infrared signals used for the communication between the remote controller 900 and the display device 200. The signals (infrared rays) other than the infrared signals from the display device 200 interact with the eyeglass device 300 as noise signals. The principles of the present embodiment to be described hereinafter make the eyeglass device 300 less sensitive to the noise signals.

According to the present embodiment, the infrared signals are used as the synchronization signals. Alternatively, radio signals and other types of signals, which may realize synchronization control between the display device 200 and the eyeglass device 300, may be used as the synchronization signals.

Figure 2:
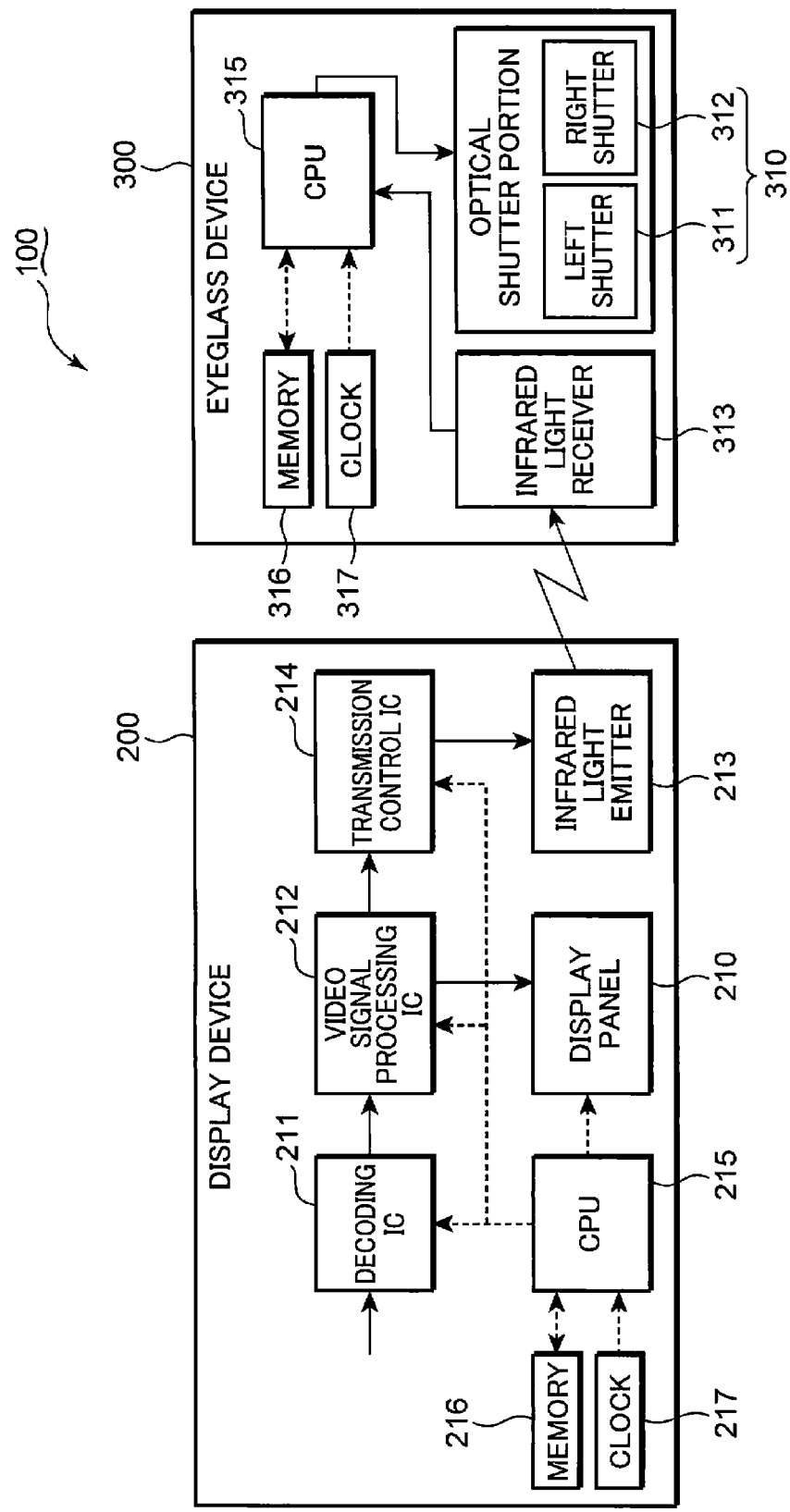
FIG. 2 is a block diagram schematically depicting a hardware configuration of the image system shown in FIG. 1.

FIG. 2 is a block diagram schematically depicting a hardware configuration of the image system 100. The hardware configuration of the image system 100 is described with reference to FIGS. 1 and 2.

The display device 200 includes a decoding IC 211, an video signal processing IC 212, a transmission control IC 214, a CPU 215, a memory 216 and a clock 217, in addition to the display panel 210 and the light emitter 213 which are described above.

An encoded video signal is input to the decoding IC 211. The decoding IC 211 decodes the input video signal, and then outputs the image data in a predetermined format. MPEG (Motion Picture Experts Group)-2, MPEG-4 and H264 are exemplified as methodologies for encoding the image.

The video signal processing IC 212 processes the video signals to display image data from the decoding IC 211 as a stereoscopic image. In the present embodiment, the video signal processing IC 212 detects images for the left and right eyes from the video signals decoded by the decoding IC 211. The video signal processing IC 212 then rearranges and time-sequentially alternates the images for the left and right eyes. Alternatively, the video signal processing IC 212 may automatically generate images for the left and right eyes in response to the video signals output by the decoding IC 211. Further alternatively, the video signal processing IC 212 may execute other signal processes related to the stereoscopic image display. The video signal processing IC 212 then generates an output signal, which is adapted to a signal input format of the display panel 210.

The video signal processing IC 212 may execute other signal processes in addition to the aforementioned signal processes. For example, the video signal processing IC 212 may adjust colors of the displayed video according to characteristics of the display panel 210. The video signal processing IC 212 may also interpolate images between frames of the video generated by the decoding IC 211 to increase a frame rate of the video.

The transmission control IC 214 generates a synchronization signal including a command signal, which is synchronized with the display of the images for the left and right eyes (L and R frame images) generated by the video signal processing IC 212, and then outputs the synchronization signal to the light emitter 213. According to the present embodiment, the transmission control IC 214 is exemplified as the generator.

The CPU 215 controls various elements of the display device 200 such as the decoding IC 211 and the video signal processing IC 212, which results in a control for entire operation of the display device 200. The CPU 215 executes the aforementioned control, for example, according to programs recorded in the memory 216 and inputs from an external device (not shown).

The memory 216 is used as a region for recording the programs executed by the CPU 215 and for holding temporary data which are generated during the program execution. A volatile RAM (Random Access Memory) or a nonvolatile ROM (Read Only Memory) is exemplified as the memory 216.

The clock 217 generates and supplies clock signals to the CPU 215 and the other composing elements. The clock signal is used as a reference for operations of various ICs and the other composing elements of the display device 200.

The display panel 210 includes a display surface where a video signal output from the video signal processing IC 212 is displayed as a video. A CRT (Cathode Ray Tube) display, a liquid crystal display, a PDP (Plasma Display Panel), organic electro-luminescence display or other apparatuses configured to display videos is preferably exemplified as the display panel 210.

The light emitter 213 transmits and outputs infrared rays as the synchronization signal to the eyeglass device 300 under control of the transmission control IC 214.

According to the present embodiment, the synchronization control between the display device 200 and the eyeglass device 300 is realized by the infrared rays used as the synchronization signals. Alternatively the synchronization control between the display device and the eyeglass device may be realized by other kinds of transmission methodologies such as cable signals, radio signals and ultrasonic signals.

The eyeglass device 300 includes a CPU 315, a memory 316 and a clock 317, in addition to the optical shutter portion 310 and the light receiver 313 which are described above.

The CPU 315 controls entire operation of the eyeglass device 300 according to programs recorded in the memory 316 and the synchronization signals from the display device 200. The CPU 315 analyzes the synchronization signal received by the light receiver 313, and controls the optical shutter portion 310 on the basis of the analysis result. According to the present embodiment, the CPU 315 is exemplified as the analyzer and the controller.

The memory 316 memorizes data of the programs, which are executed by the CPU 315. The memory 316 is also used as a region for holding temporary data while the CPU 315 executes the programs.

The clock 317 supplies clock signals to various elements of the eyeglass device 300. The clock signal is used as a reference for operations of the various elements of the eyeglass device 300. The clock signal may be divided or multiplied as appropriate.

The light receiver 313 is exemplified as the receiver configured to receive a synchronization signal, which has been transmitted by the light emitter 213 of the display device 200. According to the present embodiment, the light receiver 313 receives an infrared signal. Alternatively, if the display device transmits a radio signal as the synchronization signal, the receiver may include elements required for receiving the radio signal such as an antenna and a tuner instead of the light receiver 313. If an appropriate receiver is used as the receiver according to a type of the synchronization signal for realizing the synchronization control between the display device and the eyeglass device, similar synchronization control between the display device 200 and the eyeglass device 300 to the control described in the present embodiment is effected.

The optical shutter portion 310 includes the left shutter 311 situated in front of the left eye of a viewer wearing the eyeglass device 300, and the right shutter 312 situated in front of the right eye thereof. The left and right shutters 311, 312 are opened/closed to adjust light which is incident on the left and right eyes, respectively (light modulation). The optical shutter portion 310 appropriately adjusts the incident light to the left and right eyes under control of the CPU 315 to provide a desired optical effect to the viewer wearing the eyeglass device 300.

The hardware configuration of the image system 100 shown in FIG. 2 is just an example. For example, instead of various ICs such as the decoding IC 211 and the video signal processing IC 212, an integrated type IC with functions of these ICs may be used. Processes of programs executed by the CPU 215 may be achieved by such an element as a PLD (Programmable Logic Device) and a DSP (Digital Signal Processor). The various controls described in FIG. 2 may be achieved by software (programs) executed by the CPU instead of the hardware.

According to the present embodiment, the display device 200 includes the light emitter 213. Alternatively, the transmission control IC and the light emitter may be integrated into a control device which is separate from elements for displaying a video. The control device may generate a synchronization signal on the basis of information which is input from the display device for displaying a video, and then output the synchronization signal to the eyeglass device.

Figure 3:
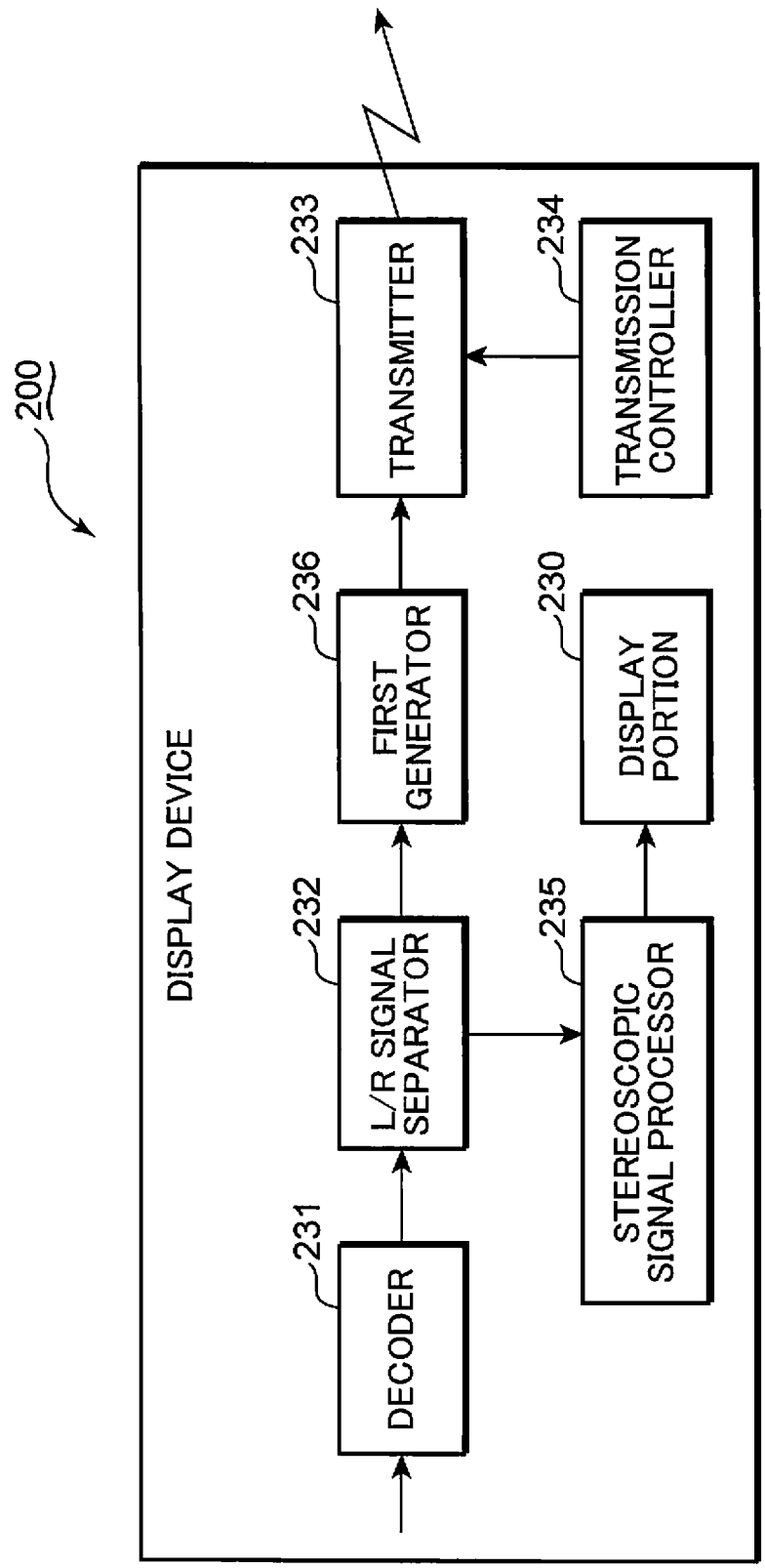
FIG. 3 is a block diagram schematically depicting a functional configuration of a display device of the image system shown in FIG. 2.

FIG. 3 is a block diagram schematically depicting a functional configuration of the display device 200. The display device 200 is described with reference to FIGS. 1 to 3.

The display device 200 includes a decoder 231, an L/R signal separator 232, a stereoscopic signal processor 235, a display portion 230, a first generator 236, a transmission controller 234 and a transmitter 233.

An encoded video signal is input to the decoder 231. The decoder 231 decodes the input video signal. The decoder 231 corresponds to the decoding IC 211 in the hardware configuration described with reference to FIG. 2.

The L/R signal separator 232 generates or separates video signals for the left and right eyes from the video signals decoded by the decoder 231.

The stereoscopic signal processor 235 adjusts the video signals for the left and right eyes separated by the L/R signal separator 232, for example, according to characteristics of the display portion 230. The stereoscopic signal processor 235 may adjust a parallax amount between the L and R frame images, for example, according to a size of the display area of the display portion 230.

The first generator 236 generates a synchronization signal including a command signal, which is synchronized with an image for the left eye (L frame image) and an image for the right eye (R frame image) generated by the L/R signal separator 232. The first generator 236 may adjust types or generation timings of the synchronization signals according to characteristics of the display portion 230. According to the present embodiment, the first generator 236 is exemplified as the generator. The synchronization signal generated by the first generator 236 is described later.

The L/R signal separator 232, the stereoscopic signal processor 235 and the first generator 236 correspond to the video signal processing IC 212 in the hardware configuration described with reference to FIG. 2.

The display portion 230 displays a video signal processed by the stereoscopic signal processor 235 as a video. The display portion 230 corresponds to the display panel 210 in the hardware configuration described with reference to FIG. 2.

The transmission controller 234 adjusts a data volume of the synchronization signal transmitted by the transmitter 233. Optionally, the transmission controller 234 may control a transmission interval of the synchronization signals to cause the transmitter 233 to execute intermittent transmission of the synchronization signals. The transmission controller 234 corresponds to the transmission control IC 214 in the hardware configuration described with reference to FIG. 2.

The transmitter 233 transmits the synchronization signal generated by the first generator 236 to the eyeglass device 300 under the control of the transmission controller 234. The transmitter 233 corresponds to the light emitter 213 in the hardware configuration described with reference to FIG. 2.

Figure 4:
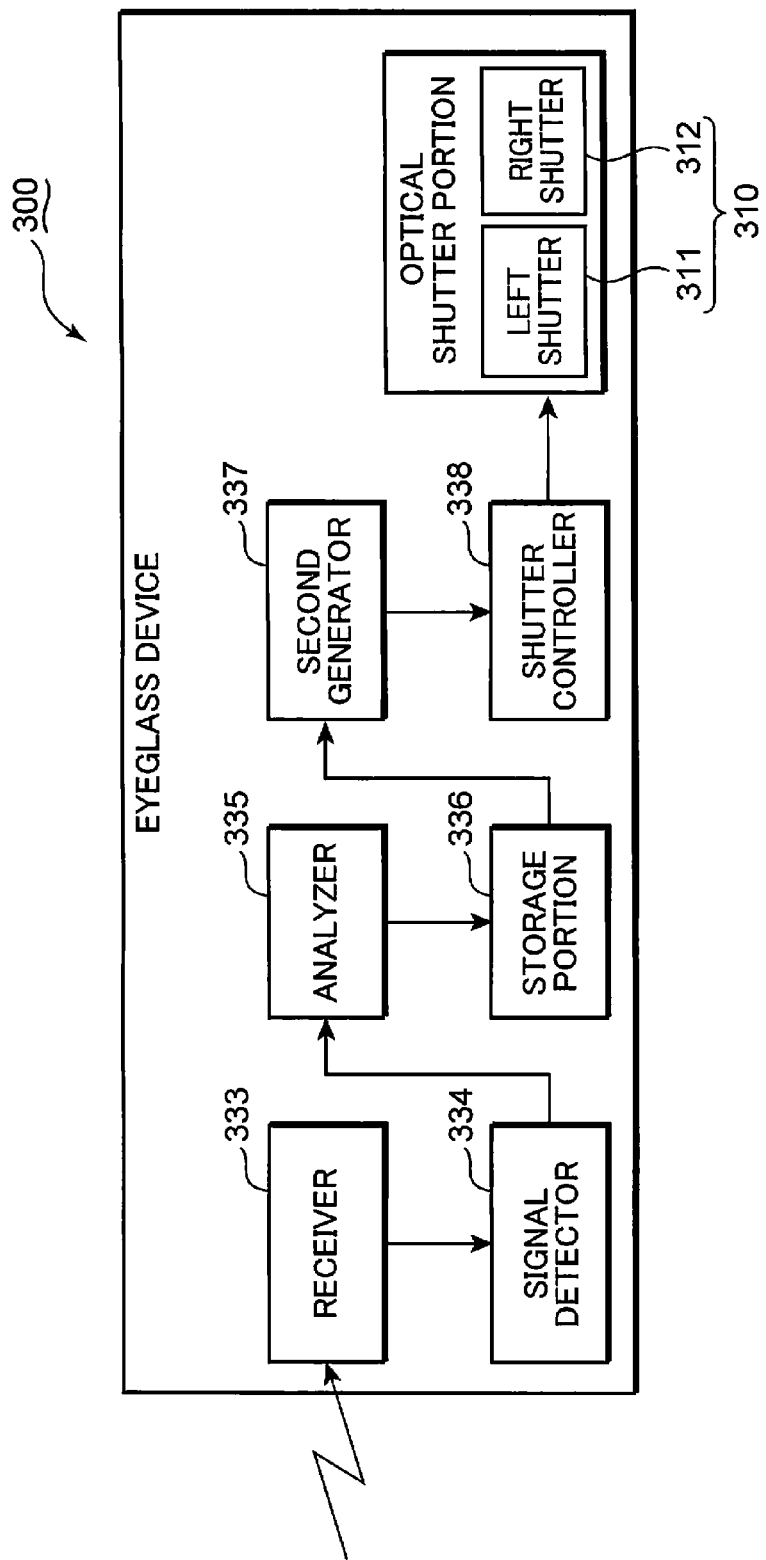
FIG. 4 is a block diagram schematically depicting a functional configuration of an eyeglass device of the image system shown in FIG. 2.

FIG. 4 is a block diagram schematically depicting a functional configuration of the eyeglass device 300. The eyeglass device 300 is described with reference to FIGS. 1 to 4.

The eyeglass device 300 includes a receiver 333, a signal detector 334, an analyzer 335, a storage portion 336, a second generator 337 and a shutter controller 338 in addition to the aforementioned optical shutter portion 310.

The receiver 333 receives a synchronization signal which the display device 200 has transmitted as infrared rays. The receiver 333 generates an electric signal in response to the received infrared rays. The generated electric signal is output to the signal detector 334 (described later). As described in the context of the hardware configuration in FIG. 2, according to the present embodiment, the infrared signal is used as the synchronization signal. Alternatively, signals other than the infrared signals may be used as the synchronization signal. For example, radio signals may be communicated between the display device and the eyeglass device.

As described above, the receiver 333 receives the infrared signal (synchronization signal) and generates the electric signal (synchronization signal) in response to the infrared signal. The signal detector 334 detects a synchronization signal from the electric signals which are output from the receiver 333. For example, the signal detector 334 detects an electric signal with a specific signal waveform as the synchronization signal.

The analyzer 335 analyzes synchronization information such as a time interval for operating the optical shutter portion 310 in response to the synchronization signal detected by the signal detector 334. For example, through the analysis for the synchronization information, the analyzer 335 may acquire information on open/close timings of the left and right shutters 311, 312.

The signal detector 334 and the analyzer 335 correspond to a part of the program executed by the CPU 315 in the hardware configuration described with reference to FIG. 2.

The storage portion 336 records and stores the control information on operation of the optical shutter portion 310 which the analyzer 335 has analyzed on the basis of the synchronization signal. The storage portion 336 corresponds to the memory 316 in the hardware configuration described with reference to FIG. 2. In the hardware configuration described with reference to FIG. 2, the CPU 315 records the control information on the operation of the optical shutter portion 310 to the memory 316.

The second generator 337 generates an internal signal for controlling the operation of the optical shutter portion 310 on the basis of the synchronization information recorded in the storage portion 336. Alternatively, the second generator 337 generates an internal signal for controlling the operation of the optical shutter portion 310 on the basis of the synchronization information analyzed by the analyzer 335 (e.g. time interval for operating the optical shutter portion 310). The second generator 337 corresponds to the CPU 315 and the clock 317 in the hardware configuration described with reference to FIG. 2.

The shutter controller 338 controls operation of the left and right shutters 311, 312 in response to the internal signal generated by the second generator 337 (i.e. synchronization information analyzed by the analyzer 335). The shutter controller 338 adjusts the open/close timings of the left and right shutters 311, 312, so that the optical shutter portion 310 executes the aforementioned assistance operation. In the hardware configuration described with reference to FIG. 2, the shutter controller 338 corresponds to programs for controlling the optical shutter 310 executed by the CPU 315. Alternatively, the shutter controller 338 corresponds to the driver (not shown) for driving the optical shutter portion 310. According to the present embodiment, the shutter controller 338 is exemplified as the controller.

The optical shutter portion 310 includes the left shutter 311 situated in front of the left eye of a viewer wearing the eyeglass device 300 and the right shutter 312 situated in front of the right eye thereof. According to the present embodiment, the optical shutter portion 310 is exemplified as the optical filter portion. Other optical elements may be used as the optical filter portion. For example, an optical element configured to adjust the transmitted light amount and an optical element configured to adjust deflection of the transmitted light may be suitably used for the optical filter portion. For example, the optical element used for the optical filter portion may include a liquid crystal element. The liquid crystal element is controlled for adjusting the transmitted light amount.

According to the present embodiment, the display portion 230 of the display device 200 alternately switches the display between the L and R frame images. Therefore the left and right shutters 311, 312 alternately increase/decrease the transmitted light amount. The optical filter portion may change a deflecting direction of the light to the left and right eyes, instead of the aforementioned shutter operation. An optical element configured to adjust the transmitted light in synchronization with the switching of the video displayed by the display device is preferably used as the optical filter portion.

The principles of the present embodiment are not limited to the functional configurations in FIGS. 3 and 4 although the principles of the present embodiment are described on the basis of the functional configurations depicted in FIGS. 3 and 4. According to the present embodiment, the transmitter 233 and the display portion 230 are integrated into one display device 200. Alternatively, the control device which transmits the synchronization signal for controlling the eyeglass device 300 may be formed as a unit which is separate from the display device having a display element for displaying a video.

The correspondence between the hardware and functional configurations described with reference to FIGS. 2 to 4 is merely an example to clarify the principles of the present embodiment. Therefore the principles of the present invention are not limited to the correspondence between the hardware and functional configurations described with reference to FIGS. 2 to 4. Accordingly the control device, the display device, the eyeglass device and the image system may have other hardware and functional configurations.

<Noise Effect on Synchronization Control Between Display Device and Eyeglass Device>

Figure 5:
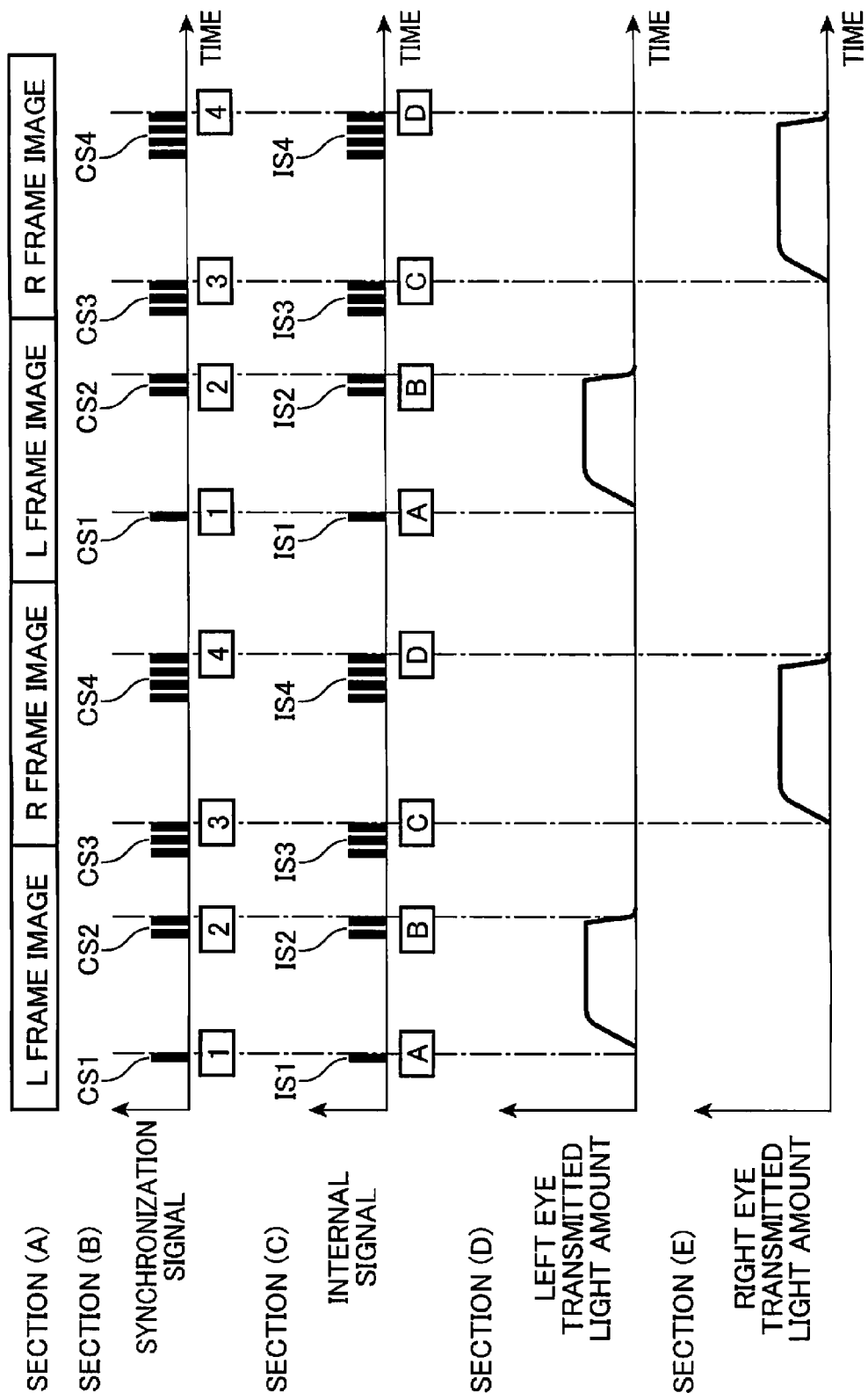
FIG. 5 is a timing chart under normal synchronization control between the display device and the eyeglass device.
Figure 6:
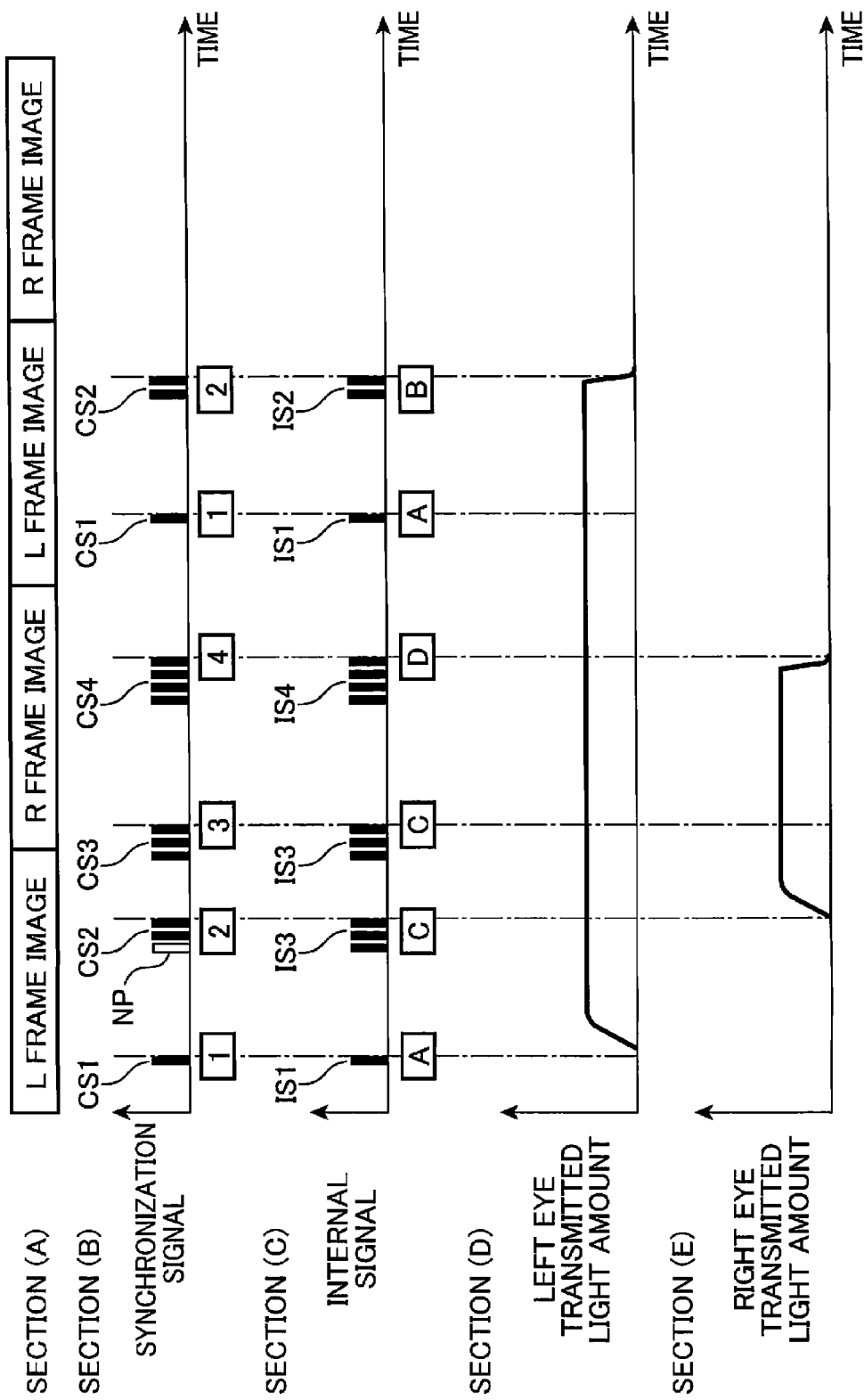
FIG. 6 is a timing chart while noises affect the synchronization control between the display device and the eyeglass device.

FIG. 5 is a timing chart under normal synchronization control between the display device and the eyeglass device. FIG. 6 is a timing chart while noise affects the synchronization control between the display device and the eyeglass device. The noise effect on the synchronization control between the display device and the eyeglass device is described with reference to FIGS. 5 and 6.

Section (A) in FIG. 5 schematically shows the switching of a video displayed by the display portion of the display device. The display portion alternately displays L and R frame images. In the description with reference to FIGS. 5 and 6, a frame rate of the video displayed by the display portion is 120 Hz as a total of the L and R frame images (L frame image: 60 Hz, R frame image: 60 Hz).

Section (B) in FIG. 5 schematically shows transmission timings of command signals included in a synchronization signal transmitted to the eyeglass device. The first generator of the display device generates the synchronization signal. The transmitter of the display device transmits the synchronization signal generated by the first generator to the eyeglass device.

In synchronization with the start of L frame image display, the transmitter of the display device transmits a first command signal CS1 for opening the left shutter of the optical shutter portion of the eyeglass device. Once the eyeglass device receives the first command signal CS1, the left shutter opens to increase the transmitted light amount to the left eye of the viewer.

The transmitter of the display device then transmits a second command signal CS2 for closing the left shutter of the optical shutter portion of the eyeglass device in synchronization with the end of the L frame image display. Once the eyeglass device receives the second command signal CS2, the left shutter closes to decrease the transmitted light amount to the left eye of the viewer.

As described above, the R frame image is displayed after the L frame image is displayed. In synchronization with the start of the R frame image display, the transmitter of the display device transmits a third command signal CS3 for opening the right shutter of the optical shutter portion of the eyeglass device. Once the eyeglass device receives the third command signal CS3, the right shutter opens to increase the transmitted light amount to the right eye of the viewer.

In synchronization with the end of the R frame image display, the transmitter of the display device then transmits a fourth command signal CS4 for closing the right shutter of the optical shutter portion of the eyeglass device. Once the eyeglass device receives the fourth command signal CS4, the right shutter closes to decrease the transmitted light amount to the right eye of the viewer.

In the synchronization control between the display device and the eyeglass device, which is described with reference to FIGS. 5 and 6, the operation of the optical shutter portion of the eyeglass device depends on a number of pulse signals included in a command signal (each of the first to fourth command signal CS1 to CS4).

The first command signal CS1 includes one pulse signal. In a protocol of the synchronization control between the display device and the eyeglass device, which is described with reference to FIGS. 5 and 6, a signal including one pulse signal is interpreted as a command signal having control content instructing to open the left shutter.

The second command signal CS2 includes two pulse signals. In the protocol of the synchronization control between the display device and the eyeglass device, which is described with reference to FIGS. 5 and 6, a signal including two pulse signals is interpreted as a command signal having control content instructing to close the left shutter.

The third command signal CS3 includes three pulse signals. In the protocol of the synchronization control between the display device and the eyeglass device which is described with reference to FIGS. 5 and 6, a signal including three pulse signals is interpreted as a command signal having control content instructing to open the right shutter.

The fourth command signal CS4 includes four pulse signals. In the protocol of the synchronization control between the display device and the eyeglass device, which is described with reference to FIGS. 5 and 6, a signal including four pulse signals is interpreted as a command signal having control content instructing to close the right shutter.

Section (C) in FIG. 5 is a schematic timing chart showing the internal signals generated by the second generator of the eyeglass device in response to the synchronization signal from the display device.

The analyzer of the eyeglass device counts the number of pulse signals included in a command signal (each of the first to fourth command signals CS1 to CS4). If a number of pulse signals included in a command signal is one (i.e. if the receiver of the eyeglass device receives the first command signal CS1), the second generator of the eyeglass device generates an internal signal IS1 for opening the left shutter in response to the first command signal CS1. If a number of pulse signals included in a command signal is two (i.e. if the receiver of the eyeglass device receives the second command signal CS2), the second generator of the eyeglass device generates an internal signal IS2 for closing the left shutter in response to the second command signal CS2. If a number of pulse signals included in a command signal is three (i.e. if the receiver of the eyeglass device receives the third command signal CS3), the second generator of the eyeglass device generates an internal signal IS3 for opening the right shutter in response to the third command signal CS3. If a number of pulse signals included in a command signal is four (i.e. if the receiver of the eyeglass device receives the fourth command signal CS4), the second generator of the eyeglass device generates an internal signal IS4 for closing the right shutter in response to the fourth command signal CS4.

The shutter controller of the eyeglass device controls the left and right shutters of the optical shutter portion in response to the internal signals IS1, IS2, IS3 and IS4 generated as described above.

Section (D) in FIG. 5 shows a change in transmitted light amount to the left eye due to the open/close control of the left shutter performed by the shutter controller. Section (E) in FIG. 5 shows a change in transmitted light amount to the right eye due to the open/close control of the right shutter performed by the shutter controller.

The left shutter opens in response to the internal signal IS1. The transmitted light amount to the left eye of the viewer then starts increasing in synchronization with the start of L frame image display. As a result, the viewer may view the L frame image with the left eye.

The left shutter closes in response to the internal signal IS2. The transmitted light amount to the left eye of the viewer then starts decreasing in synchronization with the end of the L frame image display. As a result, viewing with the left eye of the viewer ends before an R frame image is displayed.

The right shutter opens in response to the internal signal IS3. The transmitted light amount to the right eye of the viewer then starts increasing in synchronization with the start of the R frame image display. As a result, the viewer may view the R frame image with the right eye.

The right shutter closes in response to the internal signal IS4. The transmitted light amount to the right eye of the viewer then starts decreasing in synchronization with the end of the R frame image display. As a result, viewing with the right eye of the viewer ends before a new L frame image is displayed.

Thus, the eyeglass device may open/close the optical shutter portion under the control of the display device in response to the synchronization signals generated by the first generator of the display device.

FIG. 6 is a schematic timing chart when the synchronization signal described with reference to FIG. 5 includes noise signals.

Section (A) in FIG. 6 schematically shows switching of a video displayed by the display portion of the display device, like section (A) in FIG. 5. The display portion alternately displays L and R frame images.

Section (B) in FIG. 6 schematically shows transmission timings of command signals included in a synchronization signal transmitted to the eyeglass device, like section (B) in FIG. 5. The first generator of the display device generates the synchronization signal. The transmitter of the display device transmits the synchronization signal generated by the first generator to the eyeglass device.

Like section (B) in FIG. 5, the transmitter of the display device transmits a first command signal CS1 in synchronization with the start of L frame image display and a second command signal CS2 in synchronization with the end of the L frame image display. The transmitter of the display device also transmits a third command signal CS3 in synchronization with the start of R frame image display and a fourth command signal CS4 in synchronization with the end of the R frame image display.

Section (B) in FIG. 6 shows a noise pulse NP which appears immediately before the initial second command signal CS2, in addition to the above command signals (the first to fourth command signals CS1 to CS4). The receiver of the eyeglass device receives a synchronization signal which includes not only the command signals (the first to fourth command signals CS1 to CS4), but also a noise pulse NP.

Section (C) in FIG. 6 is a schematic timing chart showing internal signals generated under effect of the noise pulse NP. Section (D) in FIG. 6 shows a change in transmitted light amount to the left eye due to the open/close operation of the left shutter which is controlled in response to the internal signals generated under the effect of the noise pulse NP. Section (E) in FIG. 6 shows a change in transmitted light amount to the right eye due to the open/close operation of the right shutter which is controlled in response to the internal signals generated under the effect of the noise pulse NP.

Unlike the normal synchronization control described with reference to FIG. 5, the synchronization signal received by the receiver of the eyeglass device includes the noise pulse NP. As section (B) in FIG. 6 shows, the transmitter of the display device sequentially transmits the first to fourth command signals CS1 to CS4, like the transmission of the synchronization signal described with reference to section (B) in FIG. 5. However due to the noise pulse NP which appeared immediately before the initial second command signal CS2, the analyzer of the eyeglass device determines that the signal received by the receiver has three pulse signals. As a result, the second command signal CS2 which the transmitter of the display device initially transmitted is processed as the third command signal CS3 (i.e. the analyzer of the eyeglass device identifies the second command signal CS2 as the third command signal CS3).

Since the analyzer of the eyeglass device identifies the second command signal CS2 for closing the left shutter as the third command signal, the second generator generates the internal signal IS3 for opening the right shutter in response to the reception of the second command signal CS2. Accordingly, the right shutter opens, so that the transmitted light amount to the right eye of the viewer starts increasing in synchronization with the end of the L frame image display. Thus, the viewer views the L frame image with the right eye.

The second command signal CS2 has the control content instructing to close the left shutter. In the synchronization control described with reference to FIG. 5, the left shutter is closed in synchronization with the reception of the second command signal CS. In the synchronization control shown in FIG. 6, however, the left shutter continues to open even after the display of the L frame image ends, because the second command signal CS2 is identified as the third command signal CS3. Since the left shutter is open even during display of the R frame image which follows the L frame image, the viewer views the R frame image with the left eye.

As a result of the malfunction of the optical shutter portion due to the noise pulse NP, the transmitted light amount to the left eye of the viewer maintains a high value even while the R frame image is displayed (i.e. the left shutter stays in an open orientation) as shown in section (D) in FIG. 6. The transmitted light amount to the right eye of the viewer, on the other hand, starts increasing before the R frame image is displayed (i.e. the right shutter starts opening before the R frame image is displayed), as shown in section (E) in FIG. 6. The operation of the eyeglass device departs from the normal synchronization control between the display device and the eyeglass device. As a result, the viewer faces difficulties in stereoscopically viewing the video displayed by the display device.

<Configuration of Synchronization Signal Communicated Between Display Device and Eyeglass Device>

The principles of the present embodiment provide a synchronization signal which makes noises described with reference to FIGS. 5 and 6 less influential. The methodologies of the synchronization control between the display device and the eyeglass device, which is described with reference to FIGS. 5 and 6, are applied to the principles of the present embodiment, except for the configuration of the synchronization signal.

As described with reference to FIGS. 5 and 6, under the communication protocol which identifies the first command signal CS1 for opening the left shutter as a signal having one pulse signal, the second command signal CS2 for closing the left shutter as a signal having two pulse signals, the third command signal CS3 for opening the right shutter as a signal having three pulse signals, and the fourth command signal CS4 for closing the right shutter as a signal having four pulse signals, a received signal is potentially identified as a different command signal from the original command signal, if a noise is superimposed on the synchronization signal.

Figure 7:
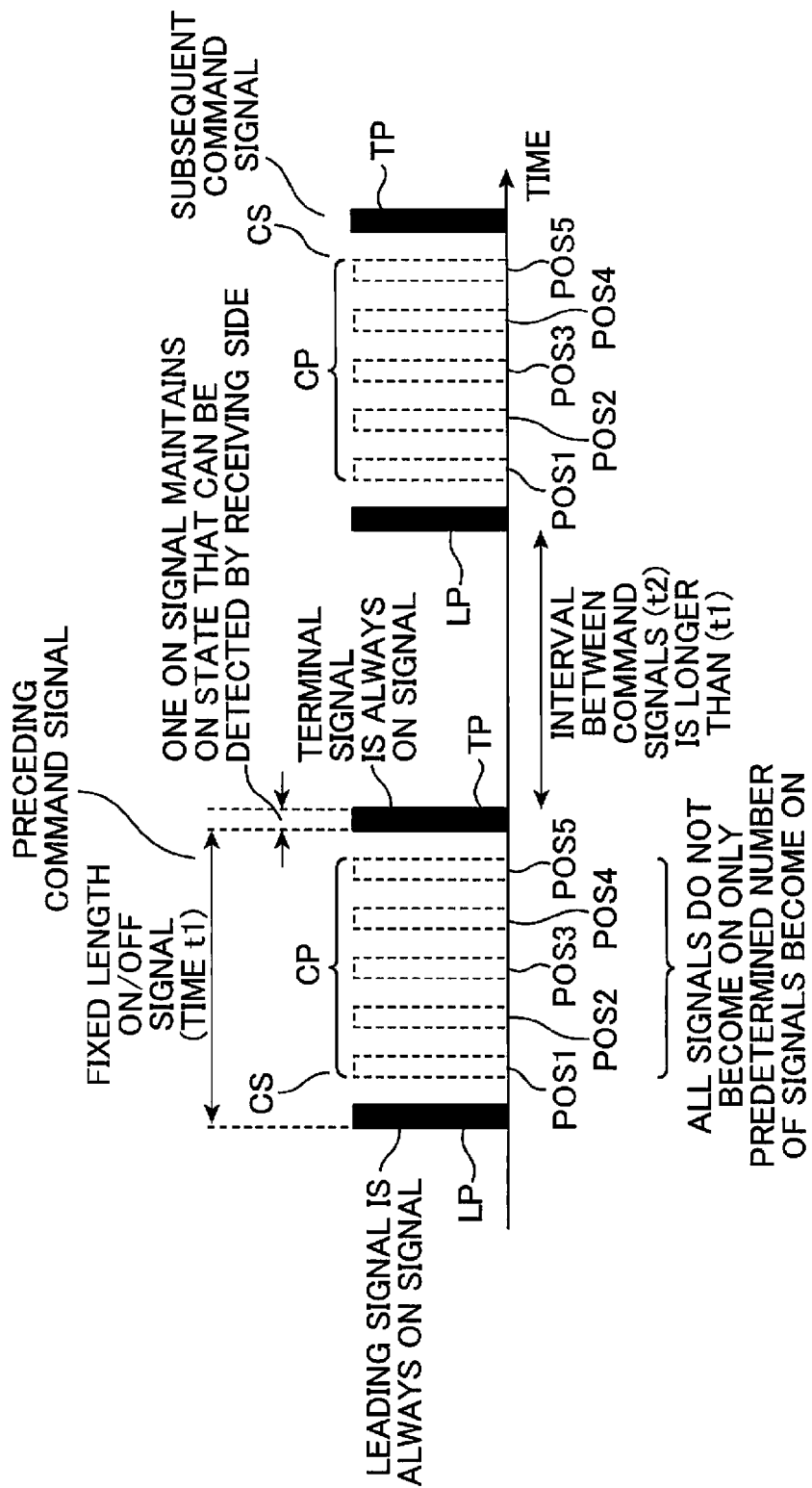
FIG. 7 is a schematic view of a command signal which is less sensitive to noises.

FIG. 7 is a schematic view depicting a configuration of a command signal which makes noises described with reference to FIGS. 5 and 6 less influential. The configuration of the synchronization signal is described with reference to FIGS. 3 to 7.

A command signal CS includes a leading pulse signal LP for notifying the start of the command signal CS and a terminal pulse signal TP for notifying the end of the command signal CS. The leading and terminal pulse signals LP, TP are always set to the "ON" state. A time interval between the leading and terminal pulse signals LP, TP is set to a constant value. In FIG. 7, the time interval between the leading and terminal pulse signals LP, TP is indicated as "t1". Therefore the command signal CS is specified as a signal with a fixed length.

The command signal CS also includes control pulse signals CP which appear between the leading and terminal pulse signals LP, TP. The control pulse signals CP are used for notifying content of the synchronization control, which is synchronized with the display of the frame images by the display portion 230 (e.g. operation to open the left shutter 311, operation to close the left shutter 311, operation to open the right shutter 312 and operation to close the right shutter 312). According to the present embodiment, one of the controls for causing the optical shutter portion 310 to execute the operation to open the left shutter 311, the operation to close the left shutter 311, the operation to open the right shutter 312 and the operation to close the right shutter 312 is exemplified as the first synchronization control, which is synchronized with the display of the frame images. Controls other than the control selected as the first synchronization control from the controls for causing the optical shutter portion 310 to execute the operation to open the left shutter 311, the operation to close the left shutter 311, the operation to open the right shutter 312, and the operation to close the right shutter 312 are exemplified as the second synchronization control, which is different from the first synchronization control.

The analyzer 335 of the eyeglass device 300 analyzes the content of the control which makes the optical shutter portion 310 execute, on the basis of time-positions (timing) of the control pulse signal CP between the leading and terminal pulse signals LP, TP. The command signal CS shown in FIG. 7 provides five time-positions arranged with a predetermined time interval for the control pulse CP between the leading and terminal pulse signals LP, TP. In FIG. 7, the five control pulse signals CP are shown in the "OFF" state, but the first generator 236 of the display device 200 sets the control pulse signal CP to the "ON" state at a predetermined number of time-positions out of the five time-positions. Therefore the command signal CS includes a predetermined number of pulse signals. Thus, the command signal CS shown in FIG. 7 is represented by "ON" or "OFF" of seven pulse signals.

The first generator 236 of the display device 200 may change the time-position of the control pulse signal CP to generate a command signal CS for transferring different control contents to the eyeglass device 300. FIG. 7 shows a first time-position POS1 which is set immediately after the leading pulse signal LP, a second time-position POS2 which is set immediately after the first time-position POS1, a third time-position POS3 which is set at the middle of the leading and terminal pulse signals LP, TP, a fourth time-position POS4 which is set immediately after the third time-position POS3, and a fifth time-position POS5 which is set immediately before the terminal pulse signal TP.

For example, the first generator 236 may set the control pulse signal CP to "ON" at the first and second time-positions POS1, POS2, so as to generate a command signal CS for opening the left shutter 311. For example, the first generator 236 may set the control pulse signal CP to "ON" at the first and third time-positions POS1, POS3, so as to generate a command signal CS for closing the left shutter 311. For example, the first generator 236 may set the control pulse signal CP to "ON" at the fourth and fifth time-positions POS4, POS5, so as to generate a command signal CS for opening the right shutter 312. For example, the first generator 236 may set the control pulse signal CP to "ON" at the third and fifth time-positions POS3, POS5, so as to generate a command signal CS for closing the right shutter 312. According to the present embodiment, one of the command signal CS for opening the left shutter 311, the command signal CS for closing the left shutter 311, the command signal CS for opening the right shutter 312, and the command signal CS for closing the right shutter 312, is exemplified as the first command signal. The other signals of the command signal CS for opening the left shutter 311, the command signal CS for closing the left shutter 311, the command signal CS for opening the right shutter 312, and the command signal CS for closing the right shutter 312 are exemplified as the second command signal.

For example, if the control pulse signal CP is "ON" at the first and second time-positions POS1, POS2, the analyzer 335 of the eyeglass device 300 determines the timing to execute the control for opening the left shutter 311. For example, if the control pulse signal CP is "ON" at the first and third time-positions POS1, POS3, the analyzer 335 of the eyeglass device 300 determines the timing to execute the control for closing the left shutter 311. For example, if the control pulse signal CP is "ON" at the fourth and fifth time-positions POS4, POS5, the analyzer 335 of the eyeglass device 300 determines the timing to execute the control for opening the right shutter 312. For example, if the control pulse signal CP is "ON" at the third and fifth time-positions POS3, POS5, the analyzer 335 of the eyeglass device 300 determines the timing to execute the control for closing the right shutter 312.

The analyzer 335 of the eyeglass device 300 measures the time interval between the initial and last pulse signals of the pulse signals received in a relatively short time by the receiver 333. Since the time interval "t1" between the leading and terminal pulse signals LP, TP is constant, as described above, if the measured time interval and the time interval "t1" between the leading and terminal pulse signals LP, TP are the same or similar, the analyzer 335 may determine that the group of the pulse signals received by the receiver 333 is a command signal CS. If the time interval between the initial and last pulse signals of the group of the pulse signals received by the receiver 333 in a relatively short time is significantly longer or shorter than the interval "t1" between the leading and terminal pulse signals LP, TP, the analyzer 335 identifies and/or processes the group of the pulse signals received by the receiver 333 as noise signals or as pulse signals influenced by noise.

As described above, the leading and terminal pulse signals LP, TP are always set to "ON". Therefore if a group of pulse signals received by the receiver 333 of the eyeglass device 300 is a normal command signal CS, the time interval between the initial and last pulse signals of the received pulse signal group becomes the same value as or a similar value to the time interval "t1" between the leading and terminal pulse signals LP, TP. Accordingly, the analyzer 335 may accurately determine whether the group of the pulse signals received by the receiver 333 is a noise signal or a normal command signal CS. According to the present embodiment, the analyzer 335 measures the time interval between pulse signals on the basis of the rise edges of the pulse signals. The measurement for the time interval between the pulse signals on the basis of the rise edges of the pulse signals allows flexible internal processes of the eyeglass device 300 even if there is a change in distance between the infrared light emitter 213 of the display device 200 and the eyeglass device 300 and a change in pulse signal width, which depends on intensity of the infrared rays emitted by the infrared light emitter 213. Thus, the eyeglass device 300 may be allowed to carry out simplified internal processes.

Instead of using the rise edge of a pulse signal as a reference, it may be determined whether or not a group of pulse signals received by the receiver 333 is a command signal CS, on the basis of the time interval from the rise edge of the preceding pulse signal to the fall edge of the subsequent pulse signal or the time interval between the rise and fall edges of the pulse signal. Thereby pulse signals of which time interval is not within a predetermined range may be detected, which results in easy noise detection.

FIG. 7 shows, as command signals CS, a preceding command signal which is transmitted on ahead and a subsequent command signal which follows the preceding command signal. The transmitter 233 of the display device 200 intermittently transmits the command signals CS. Therefore a non-transmission period "t2", where no pulse signal is transmitted, is set between the preceding and subsequent command signals.

According to the present embodiment, the non-transmission period "t2" is set to be longer than the time interval "t1" between the leading and terminal pulse signals LP, TP. Unless a pulse signal is received for a longer period than the time interval "t1" between the leading and terminal pulse signals LP, TP after the receiver 333 receives pulse signals, the analyzer 335 of the eyeglass device 300 may identify that the latest pulse signal is the terminal pulse signal TP of the preceding command signal. Unless a pulse signal is received for a longer period longer than the time interval "t1" between the leading and terminal pulse signals LP, TP after the receiver 333 receives pulse signals, the analyzer 335 may identify the subsequently received pulse signal as the leading pulse signal LP of the subsequent command signal.

Alternatively, the transmitter of the display device may intermittently transmit the preceding and subsequent command signals so that the time interval of the pulse signals in the command signal CS (e.g. time interval between the leading pulse signal LP and the control pulse signal CP, and the time interval between the control signal CP and the termination pulse TP) becomes different from the length of the non-transmission period "t2".

Preferably, the first generator 236 of the display device 200 does not set the control pulse signal CP to "ON" at all of the time-positions POS1 to POS5 assigned to the control pulse signals CP, but sets the control pulse signal CP to "ON" at some of the time-positions POS1 to POS5.

As mentioned above, the first generator 236 of the display device 200 may set the control pulse signal CP to "ON" at the two time-positions out of the five time-positions POS1 to POS5, and set the control pulse signal CP to "OFF" at the remaining three time-positions. As described above, the command signal CS is set to a fixed length. Regardless the control content which the display device 200 transfers to the eyeglass device 300, the command signal CS having the fixed length includes a predetermined number (e.g. 4) of pulse signals.

A command signal CS is defined as a signal including a predetermined number of pulse signals. Therefore the analyzer 335 of the eyeglass device 300 may determine whether the group of the pulse signals received by the receiver 333 is a command signal CS used for controlling the optical shutter portion 310, on the basis of the number of the pulse signals included in the command signal CS.

For example, if no pulse signal exists between pulse signals identified as the leading and terminal pulse signals LP, TP or if five pulse signals exist between pulse signals identified as the leading and terminal pulse signals LP, TP, the analyzer 335 does not identify the group of the pulse signals received by the receiver 333 as a command signal CS.

If a number of pulse signals included in the command signal CS is specified to four and if a pulse signal group received by the receiver 333 includes three, five or six pulse signals, the analyzer 335 does not identify the group of the pulse signals received by the receiver 333 as the command signal CS.

Unless a set value on the number of the pulse signals included in the command signal CS matches with the number of the pulse signals included in a pulse signal group received by the receiver 333, the analyzer 335 does not process the pulse signal group received by the receiver 333 as the command signal CS. Therefore it becomes less likely that there are errors in command signal identification due to the superimposed noises described with reference to FIGS. 5 and 6. According to the present embodiment, it is preferable that the command signal CS, which is transmitted from the display device 200 to the eyeglass device 300, includes a predetermined number of pulse signals regardless control information which is transferred to the eyeglass device 300.

Malfunction of the optical shutter portion 310 directly affects the viewing of the video. Therefore the number of the pulse signals included in the command signal CS, which is used for the open/close control of the left and right shutters 311, 312 of the eyeglass device 300, is preferably set to a predetermined value.

As described above, five time-positions arranged with a predetermined time interval are set for the control pulse signals CP. Therefore the analyzer 335 of the eyeglass device 300 may identify a signal which appears at a different position from the predetermined time-position (e.g. a pulse signal which appears between the leading pulse signal LP and the first time-position POS1, a pulse signal which appears between the first and second time-positions POS1, POS2, a pulse signal which appears between the second and third time-positions POS2, POS3, a pulse signal which appears between the third and fourth time-positions POS3, POS4, a pulse signal which appears between the fourth and fifth time-positions POS4, POS5, and a pulse signal which appears between the fifth time-position POS5 and the terminal pulse signal TP) as a noise signal.

The display cycle of the L and R frame images displayed by the display portion 230 of the display device 200 is in general consistent. Therefore the transmission cycle of the command signal CS transmitted by the transmitter 233 (the command signal CS for opening the left shutter 311, the command signal CS for closing the left shutter 311, the command signal CS for opening the right shutter 312, and the command signal CS for closing the right shutter 312) becomes substantially consistent.

The analyzer 335 of the eyeglass device 300 may identify whether or not a group of pulse signals received by the receiver 333 is the command signal CS used for controlling the optical shutter portion 310 on the basis of the reception cycle of the command signal CS. If the receiver 333 receives a group of pulse signals, which may be identified as the command signal CS for opening or closing the left shutter 311, at a timing departing from a multiple of the display cycle of the L frame image, the analyzer 335 does not process the pulse signal group received by the receiver 333 as the command signal CS. If the receiver 333 receives a group of pulse signals, which may be identified as the command signal CS for opening or closing the right shutter 312, at a timing departing from a multiple of the display cycle of the R frame image, the analyzer 335 does not process the pulse signal group received by the receiver 333 as the command signal CS. Therefore even if a group of pulse signals similar to the command signal CS is received because of noise, the eyeglass device 300 may remove the signal group as noise on the basis of a reception interval with the same command signals received previously and subsequently.

According to the present embodiment, the pulse signal has a rectangular waveform. Alternatively, pulse signals having different waveforms may be used. It becomes more difficult for the receiver 333 of the eyeglass device 300 to detect a pulse signal if the pulse signal is shorter in width (e.g. in the case of a pulse signal having an impulse type waveform). Therefore it is preferable that the width of the pulse signal is set to a value large enough for the receiver 333 to identify the pulse signal.

FIG. 8 shows combinations of "ON" and "OFF" of the pulse signals in the command signal CS described with reference to FIG. 7. The command signal is described with reference to FIGS. 3, 4, 7 and 8.

Various pulse signal patterns of the command signal CS shown in FIG. 8 is suitably used for communication between the display device 200 and the eyeglass device 300. The command signal CS shown in FIG. 8 has the leading pulse LP which indicates the start of the command signal CS, the terminal pulse signal TP which indicates the end of the command signal CS, and the control pulse signals CP between the leading and terminal pulse signals LP, TP. The leading and terminal pulse signals LP, TP are set to the "ON" state all over the patterns of the command signal.

There are five time-positions between the leading and terminal pulse signals LP, TP to be assigned to the control pulse signals CP. The five time-positions are set with a consistent time interval between the leading and terminal pulse signals LP, TP. In all the patterns of the command signals CS, the control pulse signal CP is set to the "ON" state at two time-positions out of the five time-positions, and the control pulse signal CP is set to the "OFF" state at the other time-positions.

There are ten combinations where the control pulse signal CP is "ON" at two time-positions out of the five time-positions. Therefore according to the configuration of the command signal CS shown in FIG. 8, ten patterns of the command signal CS are generated. The ten patterns of the command signal CS conform to the generation conditions of the command signal CS described with reference to FIG. 7. Therefore the analyzer 335 of the eyeglass device 300 may accurately determine whether the receiver 333 appropriately received the command signal CS. Accordingly, it becomes less likely that the eyeglass device 300 malfunctions due to noise under communication of the command signal CS shown in FIG. 8.

The ten patterns of the command signal CS shown in FIG. 8 include four pulse signals in total (leading pulse signal LP (one pulse signal), control pulse signals CP (two pulse signals), and terminal pulse signal TP (one pulse signal)). The total number of the pulse signals included in the command signal CS may be three or greater than four.

FIG. 9 shows different combinations of "ON" and "OFF" of the pulse signals in the command signal CS described with reference to FIG. 7. The command signal is described with reference to FIGS. 3, 4, 7 and 9.

The command signal CS shown in FIG. 9 includes the leading pulse signal LP which indicates the start of the command signal CS, the terminal pulse signal TP which indicates the end of the command signal CS, and the control pulse signals CP between the leading and terminal pulse signals LP, TP. The leading and terminal pulse signals LP, TP are set to the "ON" state all over the patterns of the command signal.

There are five time-positions between the leading and terminal pulse signals LP, TP to be assigned to the control pulse signals CP. The five time-positions are set with a consistent interval between the leading and terminal pulse signals LP, TP. In all the patterns of the command signal CS, the control pulse signal CP is set to the "ON" state in three time-positions out of the five time-positions, and the control pulse signal CP is set to the "OFF" state at the other time-positions.

There are ten combinations where the control pulse signal CP is "ON" at three time-positions out of the five time-positions. Therefore according to the configuration of the command signal CS shown in FIG. 9, ten patterns of the command signal CS are generated. The ten patterns of the command signal CS conform to the generation conditions of the command signal CS described with reference to FIG. 7. Therefore the analyzer 335 of the eyeglass device 300 may accurately determine whether the receiver 333 appropriately receives the command signal CS. As a result, it becomes less likely that the eyeglass device 300 malfunctions due to noise under the communication of the command signal CS shown in FIG. 9.

The ten patterns of the command signal CS shown in FIG. 9 include five pulse signals in total (leading pulse signal LP (one pulse signal), control pulse signals CP (three pulse signals) and terminal pulse signal TP (one pulse signal)).

Out of the ten patterns of the command signal CS shown in FIGS. 8 and 9 respectively, four patterns of the command signal CS, for example, may be used for transferring control information for the open/close operation of the optical shutter portion 310, and six patterns of the command signal CS may be used for transferring other information from the display device 200 to the eyeglass device 300. Unless there are many types of information to be transferred from the display device 200 to the eyeglass device 300, a number of the time-positions assigned to the control pulse signals CP may be set to a value less than five. If there are many types of information to be transferred from the display device 200 to the eyeglass device 300, a number of the time-positions assigned to the control pulse signal CP may be set to a value greater than five.

FIG. 10 shows different combinations of "ON" and "OFF" of the pulse signals in the command signal CS described with reference to FIG. 7. The command signal is described with reference to FIGS. 3, 4, 7 and 10.

The command signal CS shown in FIG. 10 includes the leading pulse signal LP which indicates the start of the command signal CS, the terminal pulse signal TP which indicates the end of the command signal CS, and the control pulse signals CP between the leading and terminal pulse signals LP, TP. The leading and terminal pulse signals LP, TP are set to the "ON" state all over the patterns of the command signal.

There are four time-positions between the leading and terminal pulse signals LP, TP to be assigned to the control pulse signals CP. The four time-positions are set with a consistent time interval between the leading and terminal pulse signals LP, TP. In all the patterns of the command signal CS, the control pulse signal CP is set to the "ON" state at two time-positions out of the four time-positions, and the control pulse signal CP is set to the "OFF" state at the other time-positions.

There are six combinations where the control pulse signal CP is "ON" at two time-positions out of the four time-positions. Therefore according to the configuration of the command signal CS shown in FIG. 10, six patterns of the command signal CS are generated. The six patterns of the command signal CS conform to the generation conditions of the command signal CS described with reference to FIG. 7. Therefore the analyzer 335 of the eyeglass device 300 may accurately determine whether the receiver 333 appropriately receives the command signal CS. Accordingly, it becomes less likely that the eyeglass device 300 malfunctions due to noise under communication of the command signal CS shown in FIG. 10.

The six patterns of the command signal CS shown in FIG. 10 include four pulse signals in total (leading pulse signal LP (one pulse signal), control pulse signals CP (two pulse signals) and terminal pulse signal TP (one pulse signal)).

FIG. 11 shows different combinations of "ON" and "OFF" of the pulse signals in the command signal CS described with reference to FIG. 7. The command signal is described with reference to FIGS. 3, 4, 7 and 11.

The command signal CS shown in FIG. 11 includes the leading pulse signal LP which indicates the start of the command signal CS, the terminal pulse signal TP which indicates the end of the command signal CS, and the control pulse signals CP between the leading and terminal pulse signals LP, TP. The leading and terminal pulse signals LP, TP are set to the "ON" state all over the patterns of the command signal.

There are four time-positions between the leading and terminal pulse signals LP, TP to be assigned to the control pulse signals CP. The four time-positions are set with a consistent time interval between the leading and terminal pulse signals LP, TP. In all the patterns of the command signal CS, the control pulse signal CP is set to the "ON" state at three time-positions out of the four time-positions, and the control pulse signal CP is set to the "OFF" state at the other time-positions.

There are four combinations where the control pulse signal CP is "ON" in three time-positions out of the four time-positions. Therefore according to the configuration of the command signal CS shown in FIG. 11, four patterns of the command signal CS are generated. The four patterns of the command signal CS conform to the generation conditions of the command signal CS described with reference to FIG. 7. Therefore the analyzer 335 of the eyeglass device 300 may accurately determine whether the receiver 333 appropriately receives the command signal CS. Accordingly, it becomes less likely that the eyeglass device 300 malfunctions due to noise under communication of the command signal CS shown in FIG. 11.

The four patterns of the command signal CS shown in FIG. 11 include five pulse signals in total (leading pulse signal LP (one pulse signal), control pulse signals CP (three pulse signals), and terminal pulse signal TP (one pulse signal)).

As FIGS. 8 to 11 show, a pattern number of the command signal CS depends on the number of the time-positions assigned to the control pulse signals CP and a ratio of the control pulse signals CP which are set to the "ON" state to the number of time-positions. Therefore the numbers of the time-positions assigned to the control pulse signals CP and control pulse signals CP are appropriately determined according to a number of types of information transferred from the display device 200 to the eyeglass device 300.

The command signals CS described with reference to FIGS. 8 to 11 satisfy the following conditions.

(1) The total number of the pulse signals included in a command signal CS is consistent.

(2) The time interval between the leading pulse signal LP which indicates the start of the command signal CS and the terminal pulse signal TP which indicates the end of the command signal CS is consistent.

(3) The leading and terminal pulse signals LP, TP are always set to the "ON" state.

(4) A predetermined number of the control pulse signals CP are set to the "ON" state at the time-positions which are set between the leading and terminal pulse signals LP, TP with a consistent time interval.

If communication between the display device 200 and the eyeglass device 300 is performed by means of only the command signals CS which satisfy the above conditions, entry of noise may be more accurately detected, so that the open/close control of the left and right shutters 311, 312 of the eyeglass device 300 may be appropriately performed.

<Determination Process for Received Pulse Signal Group>

Figure 12:
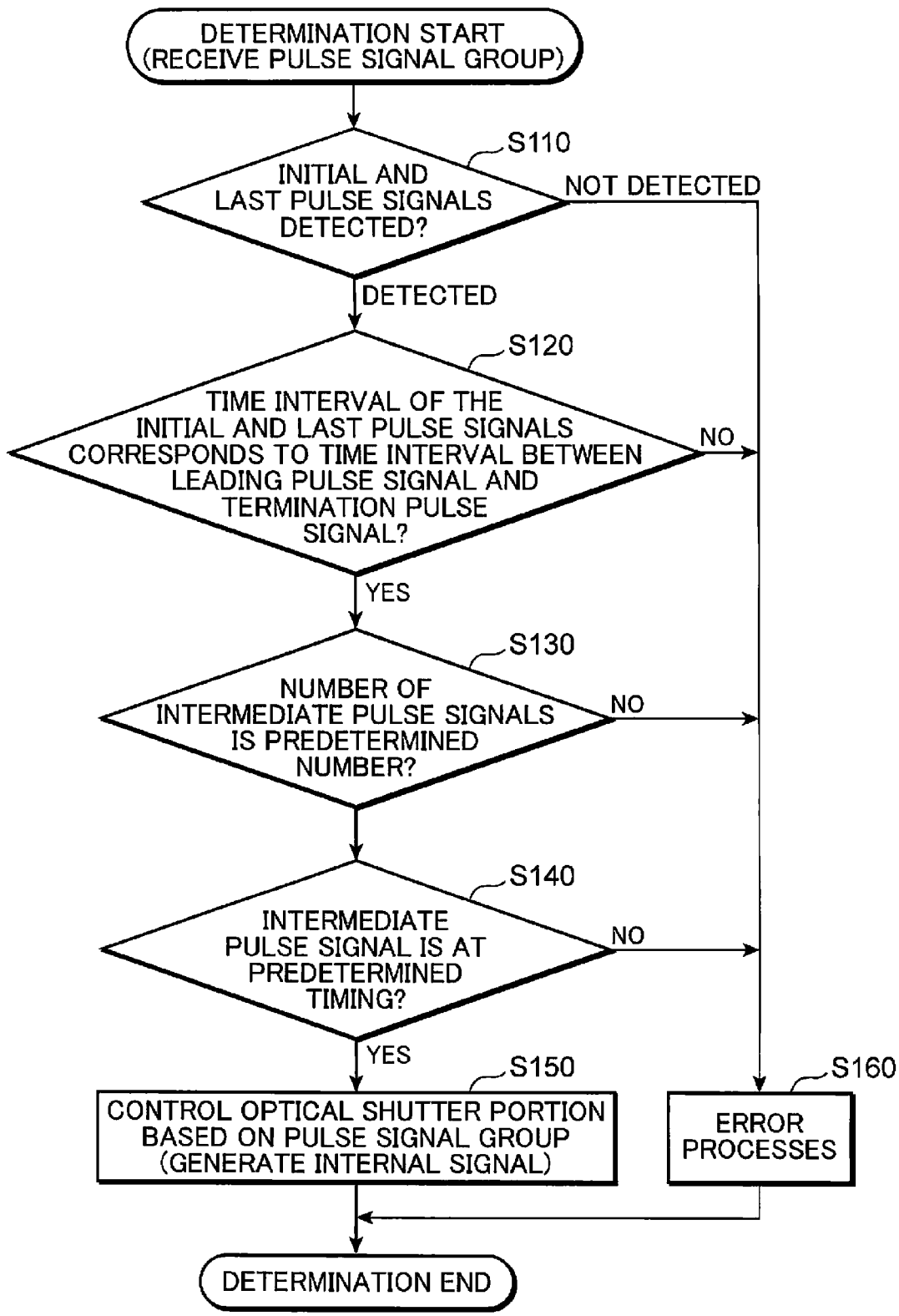
FIG. 12 is a flow chart schematically depicting determination processes for a pulse signal group received by a receiver of the eyeglass device.

FIG. 12 is a flow chart schematically depicting a determination process for a pulse signal group received by the receiver 333 of the eyeglass device 300. FIG. 13 is a schematic timing chart depicting the pulse signal group received by the receiver 333 of the eyeglass device 300. The determination process for the pulse signal group is described with reference to FIGS. 3, 4, FIGS. 7 to 9, FIGS. 12 and 13.

The determination process shown in FIG. 12 is mainly executed by the analyzer 335 of the eyeglass device 300. If the receiver 333 receives a pulse signal group, the analyzer 335 receives electric signals in response to the pulse signal group via the signal detector 334. The analyzer 335 then determines whether or not the pulse signal group received by the receiver 333 is a normal command signal CS.

(Step S110)

The analyzer 335 detects an initial pulse signal and a last pulse signal of the pulse signal group received by the receiver 333. As described with reference to FIG. 7, if a non-transmission period "t2" longer than "t1", which is specified as a time interval between the leading and terminal pulse signals LP, TP, is set in the communication protocol between the display device 200 and the eyeglass device 300, the analyzer 335 may determine the pulse signal which has been received after the non-pulse signal reception period exceeding "t1" as the initial pulse signal of the pulse signal group. Unless a pulse signal is received for a period exceeding "t1" after the pulse signals are received, the analyzer 335 may determine the latest pulse signal as the last pulse signal of the pulse signal group. For example, it may be determined on the basis of detection for a rise edge of a pulse signal whether the pulse signal is received or not.

As FIG. 13 shows, if the receiver 333 receives a pulse signal P1 after a non-reception period exceeding "t1", the analyzer 335 identifies the pulse signal P1 as the initial pulse signal. Unless the receiver 333 receives a pulse signal for a period exceeding "t1" after reception of the pulse signal P4, the analyzer 335 identifies the pulse signal P4 as the last pulse signal. Thus, the analyzer 335 detects the elapse of the non-reception period to perform analysis processes for received pulses. This makes it unnecessary to perform analysis processes whenever a pulse signal is received, so that processing time of a microcomputer may be shortened to decrease battery (not shown) consumption. A command constituted by pulse signals disclosed in the present invention conforms to the rule shown in FIG. 7, so that a length of the pulse signal group constituting the command is predetermined to one specific value. Therefore "t1" for detecting a breakpoint of a series of the pulse signals may be only one type, which results in simplified processes of the microcomputer. Thus it becomes less likely that there are errors in command determination due to noise entry.

If the initial and last pulse signals are detected, the analyzer 335 executes step S120. If only a single pulse signal is detected, the analyzer 335 executes step S160 for error processes. Unless a pulse signal is received for a predetermined period or more and/or pulse signals are continuously received for a predetermined period or more as well, the analyzer 335 may execute step S160 for error processes.

(Step S120)

The analyzer 335 measures a time period from the reception time of the initial pulse signal P1 to the reception time of the last pulse signal P4. For example, the reception times of the pulse signals P1, P4 may be determined on the basis of the rise edges of the pulse signals P1, P4. The analyzer 335 measures the time period MT from the rise edge of the initial pulse signal P1 to the rise edge of the last pulse signal P4. Then the analyzer 335 compares the time interval between the leading and terminal pulse signals LP, TP defined by the communication protocol between the display device 200 and the eyeglass device 300 with the measured time MT.

If the measured time MT is the same as or similar to the time interval between the leading and terminal pulse signals LP, TP, the analyzer 335 then executes step S130. If the measured time MT departs from the time interval between the leading and terminal pulse signals LP, TP, the analyzer 335 determines that the pulse signals received by the receiver 333 are not a normal command signal CS. The analyzer 335 then executes step S160 for error processes.
(Step S130)

The analyzer 335 counts a number of the pulse signals existing between the initial and last pulse signals P1, P4. The analyzer 335 may detect the pulse signals between the initial and last pulse signals P1, P4 on the basis of their rise edges.

For example, if the communication protocol between the display device 200 and the eyeglass device 300 defines that two control pulse signals CP are set to the "ON" state, as described with reference to FIG. 8, the analyzer 335 determines that the pulse signal group received by the receiver 333 is the command signal CS specified in the communication protocol if the analyzer 335 identifies the pulse signals P2, P3 at appropriate time-positions. For example, if the communication protocol between the display device 200 and the eyeglass device 300 defines that three control pulse signals CP are set to the "ON" state, as described with reference to FIG. 9, the analyzer 335 determines that the pulse signal group received by the receiver 333 is not the command signal CS specified in the communication protocol if the analyzer 335 identifies only the pulse signals P2, P3 between the initial and last pulse signals P1, P4.

The analyzer 335 may measure a time interval between the times corresponding to the rise edges of the initial pulse signal P1 and the pulse signal P2 to determine whether the pulse signal P2 corresponds to the time-position of the control pulse signal CP specified in the communication protocol between the display device 200 and the eyeglass device 300. Similarly, the analyzer 335 may measure a time interval between the times corresponding to the rise edges of the initial pulse signal P1 and the pulse signal P3 to determine whether the pulse signal P3 corresponds to the time-position of the control pulse signal CP specified in the communication protocol between the display device 200 and the eyeglass device 300.

For example, if the communication protocol between the display device 200 and the eyeglass device 300 defines that two control pulse signals CP are set to the "ON" state, as described with reference to FIG. 8, and if the pulse signals P2, P3 correspond to the time-positions of the control signals CP specified in the communication protocol, the analyzer 335 determines that the pulse signal group received by the receiver 333 is the command signal CS specified in the communication protocol. Unless at least one of the pulse signals P2, P3 corresponds to the time-position of the control pulse signal CP specified in the communication protocol, the analyzer 335 determines that the pulse signal group received by the receiver 333 is not the command signal CS specified in the communication protocol. According to the aforementioned procedure, a pulse signal received at a different timing from the predetermined timing is detected. Therefore it becomes likely that a command containing noise is detected and eliminated.

If it is determined that the pulse signal group received by the receiver 333 is the command signal CS specified in the communication protocol, the analyzer 335 then executes step S140. If it is determined that the pulse signal group received by the receiver 333 is not the command signal CS specified in the communication protocol, the analyzer 335 then executes step S160 for error processes.
(Step S140)

The analyzer 335 measures the time-positions of the intermediate pulse signals (pulse signals P2, P3) which appear between the initial and last pulse signals P1, P4. If it is determined that the intermediate pulse signals is received at predetermined timings as a result of the measurement, the analyzer 335 then executes step S150. Unless the intermediate pulse signals is not received at the predetermined timings, the analyzer 335 then executes step S160 for error processes. The processes in steps S140 and S130 may be executed in parallel. For example, a number of intermediate pulse signals may be determined at the same time as the measurement of the time-positions of the intermediate pulse signals. If the analyzer 335 measures the time of the rise edge of each pulse signal which appears between the initial and last pulse signals P1, P4 to determine the timings of the intermediate pulse signals, the analyzer 335 may count a number of the rise edges of the pulse signals which appear between the initial and last pulse signals P1, P4 at the same time.
(Step S150)

In response to the pulse signal group determined as the command signal CS, the analyzer 335 records the synchronization information (control content specified by the receiving time of the pulse signal group and control pulse signals CP which correspond to the pulse signals P2, P3) in the storage portion 336. The second generator 337 generates an internal signal on the basis of the synchronization information recorded in the storage portion 336. The shutter controller 338 controls the optical shutter portion 310 in response to the internal signal.
(Step S160)

If it is determined that the pulse signal group received by the receiver 333 is not a command signal CS, the analyzer 335 executes error processes. For example, the analyzer 335 executes processes for ignoring the pulse signal group received by the receiver 333. Alternatively the analyzer 335 may further analyze the pulse signal group received by the receiver 333 to identify and eliminate noise pulse signals included in the pulse signal group.

Through the determination process shown in FIG. 12, the analyzer 335 may appropriately determine whether or not the pulse signal group received by the receiver 333 corresponds to a command signal CS specified in the communication protocol. Since the shutter controller 338 controls the optical shutter portion 310 only on the basis of an appropriately received command signal CS, it becomes less likely that the optical shutter portion 310 malfunctions compared with prior arts.

The analyzer 335 may determine whether or not the pulse signal group received by the receiver 333 is the command signal CS through processes other than the determination process shown in FIG. 12. For example, the analyzer 335 may determine whether or not the pulse signal group received by the receiver 333 corresponds to the command signal CS on the basis of a number of pulse signals included in the pulse signal group (total number of pulse signals in the "ON" state) after the start and end of the pulse signal group are determined in step S110.

In addition, after step S130, the analyzer 335 may execute comparison with a reception cycle of the preceding pulse signal groups which has been determined as the command signal CS. The analyzer 335 may determine whether the pulse signal group received by the receiver 333 is received at an appropriate reception cycle on the basis of the comparison with the previous reception data. If the pulse signal group is received by the receiver 333 at an inappropriate timing, compared with the past reception data, the analyzer 335 may perform error processes in step S160 on the pulse signals received by the receiver 333. If the pulse signal group is received by the receiver 333 at an appropriate timing, compared with the past reception data, the analyzer 335 may execute step S150.

The display device 200, the eyeglass device 300 and the image system 100 with these devices according to the principles of the present embodiment may provide an environment to view videos with little malfunction due to noise. The principles of the present embodiment are described on the basis of the configuration described with reference to FIGS. 2 to 4, but other configurations conforming to the principles of the present embodiment may be used for the display device, eyeglass device and image system. For example, software installed in the eyeglass device may execute the aforementioned various functions and processes. Alternatively the aforementioned integrated circuit, in which control algorithms are installed, may be used for the display device 200, the eyeglass device 300 and the image system 100 with these devices.

In the aforementioned embodiments, it is described that noise affects the synchronization signal transmitted from the display device 200 to the eyeglass device 300 while a stereoscopic image is viewed. Descriptions of the present embodiment are not, however, limited to this. For example, the display device may alternately display images of a few contents, instead of the stereoscopic image device. The shutters for both eyes may be opened if an image selected by the eyeglass device is displayed whereas the shutters for both eyes may be closed in the other cases, so that a few contents may be viewed in one image system 100. In such a case as well, the image system becomes less sensitive to noise if synchronization signals transmitted from the display device 200 to the eyeglass device 300 is configured as described in the aforementioned embodiment.

The aforementioned embodiment mainly includes the following configurations.

A display device according to the aforementioned embodiment comprises: a display portion configured to display a video; a generator configured to generate a synchronization signal including a command signal which is synchronized with display of a frame image of the video; and a transmitter configured to transmit the synchronization signal, wherein the command signal includes a predetermined number of pulse signals, and the command signal includes a leading pulse signal for notifying a start of the command signal, a terminal pulse signal for notifying an end of the command signal, and control pulse signals for notifying a content of synchronization control which is synchronized with the display of the frame image.

According to the aforementioned configuration, the generator generates the synchronization signal which is synchronized with the display of the frame image of the video displayed by the display portion. The synchronization signal transmitted by the transmitter includes a command signal which is synchronized with the display of the frame image of the video. The command signal includes a leading pulse signal for notifying the start of the command signal, a terminal pulse signal for notifying the end of the command signal, and control pulse signals for notifying a content of the synchronization control which is synchronized with the display of the frame image. Since the command signal includes a predetermined number of pulse signals, a noise signal included in the synchronization signal is easily identified.

In the aforementioned configuration, it is preferable that the synchronization control includes first synchronization control and second synchronization control which is different from the first synchronization control, the command signal includes a first command signal for notifying a content of the first synchronization control, and a second command signal for notifying a content of the second synchronization control, and the generator changes a time-position of the control pulse signals between the leading and terminal pulse signals to generate the first and second command signals.

According to the aforementioned configuration, the synchronization control includes the first synchronization control and the second synchronization control, which is different from the first synchronization control. The command signal includes the first command signal for notifying the content of the first synchronization control, and the second command signal for notifying the content of the second synchronization control. The generator changes the time-position of the control pulse signals between the leading and terminal pulse signals to generate the first and second command signals. Since a noise signal included in the synchronization signal is easily identified, as described above, it becomes likely that the first and second synchronization controls are appropriately notified.

In the aforementioned configuration, it is preferable that a transmission interval between the leading and terminal pulse signals is determined as a constant value, a preceding command signal which is transmitted on ahead and a subsequent command signal which follows the preceding command signal are used as the command signal, and the transmitter intermittently transmits the preceding and subsequent command signals so that a time interval between the terminal pulse signal of the preceding command signal and the leading pulse signal of the subsequent command signal becomes different from a time interval of the pulse signals in the command signal.

According to the aforementioned configuration, the preceding command signal, which is transmitted on ahead, and the subsequent command signal, which follows the preceding command signal are used as the command signal. The transmission interval between the leading and terminal pulse signals is determined as a constant value. Since the transmitter intermittently transmits the preceding and subsequent command signals so that the time interval between the terminal pulse signal of the preceding command signal and the leading pulse signal of the subsequent command signal becomes different from the time interval of the pulse signals in the command signal, the terminal pulse signal of the preceding command signal and/or the leading pulse signal of the subsequent command signal may be more easily identified.

In the aforementioned configuration, it is preferable that the transmitter transmits the preceding and subsequent command signals so that the time interval between the terminal pulse signal of the preceding command signal and the leading pulse signal of the subsequent command signal becomes longer than a transmission interval between the leading and terminal pulse signals included in the command signal.

According to the aforementioned configuration, the transmitter transmits the preceding and subsequent command signals so that the time interval between the terminal pulse signal of the preceding command signal and the leading pulse signal of the subsequent command signal becomes longer than the transmission interval between the leading and terminal pulse signals. Therefore the terminal pulse signal of the preceding command signal and/or the leading pulse signal of the subsequent command are more easily identified.

An eyeglass device according to the aforementioned embodiment comprises: an optical filter portion which adjusts a transmitted light amount to an eye of a viewer in synchronization with display of a frame image of a video to execute an assistance operation for assisting in stereoscopically viewing the video; a receiver configured to receive a synchronization signal for executing the assistance operation which is synchronized with the display of the frame image; an analyzer configured to analyze the synchronization signal; and a controller configured to control the optical filter portion based on an analysis result of the analyzer, wherein the synchronization signal includes a command signal having a predetermined number of pulse signals, and the command signal includes a leading pulse signal for notifying a start of the command signal, a terminal pulse signal for notifying an end of the command signal, and control pulse signals for notifying a content of the assistance operation which is synchronized with the display of the frame image.

According to the aforementioned configuration, the optical filter portion adjusts the transmitted light amount to the eye of a viewer in synchronization with the display of the frame image of the video. The receiver receives the synchronization signal to execute the assistance operation which is synchronized with the display of the frame image. The analyzer analyzes the synchronization signal. The controller controls the optical filter portion on the basis of the analysis result of the analyzer. The synchronization signal includes the command signal, which includes a leading pulse signal for notifying the start of the command signal, a terminal pulse signal for notifying the end of the command signal, and a control signal for notifying a content of the assistance operation which is synchronized with the display of the frame image. Since a predetermined number of pulse signals are included in the command signal, the analyzer may easily identify a noise signal in the synchronization signal.

In the aforementioned configuration, it is preferable that the analyzer determines whether a signal received by the receiver is the command signal used for controlling the optical filter portion based on a reception interval between the leading and terminal pulse signals.

According to the aforementioned configuration, the analyzer determines whether the signal received by the receiver is the command signal used for controlling the optical filter portion on the basis of the reception interval between the leading and terminal pulse signals. Therefore the optical filter portion may execute the assistance operation in response to the command signal which has been appropriately received.

In the aforementioned configuration, it is preferable that the analyzer determines whether the signal received by the receiver is the command signal used for controlling the optical filter portion based on a number of pulse signals between the leading and terminal pulse signals.

According to the aforementioned configuration, the analyzer determines whether the signal received by the receiver is the command signal used for controlling the optical filter portion on the basis of the number of pulse signals between the leading and terminal pulse signals. Therefore the optical filter portion may execute the assistance operation in response to the command signal which has been appropriately received.

In the aforementioned configuration, it is preferable that the analyzer determines whether the signal received by the receiver is the command signal used for controlling the optical filter portion based on time-positions defining positions of the pulse signals between the leading and terminal pulse signals.

According to the aforementioned configuration, the analyzer determines whether the signal received by the receiver is the command signal used for controlling the optical filter portion on the basis of the time-positions defining positions of the pulse signals between the leading and terminal pulse signals. Therefore the optical filter portion may execute the assistance operation in response to the command signal which has been appropriately received.

In the aforementioned configuration, it is preferable that the analyzer determines control content for the optical filter portion based on the time-position of the control pulse signals between the leading and terminal pulse signals.

According to the aforementioned configuration, the analyzer determines the control content for the optical filter portion on the basis of the time-position of the control pulse signals between the leading and terminal pulse signals. Therefore the optical filter portion may appropriately execute the assistance operation.

In the aforementioned configuration, it is preferable that a first command signal for causing the optical filter portion to execute a first adjustment operation for adjusting the transmitted light amount, and a second command signal for causing the optical filter portion to execute a second adjustment operation, which is different from the first adjustment operation, are used as the command signal, and the analyzer determines whether the signal received by the receiver is the command signal used for controlling the optical filter portion based on a reception cycle of at least one of the first and second command signals.

According to the aforementioned configuration, the first command signal for causing the optical filter portion to execute the first adjustment operation for adjusting the transmitted light amount and the second command signal for causing the optical filter portion to execute the second adjustment operation, which is different from the first adjustment operation, are used as the command signal. The analyzer determines whether the signal received by the receiver is the command signal used for controlling the optical filter portion on the basis of the reception cycle of at least one of the first and second command signals. Therefore the optical filter portion may execute the first and second adjustment operations on the basis of the first and second command signals which have been appropriately received.

In the aforementioned configuration, it is preferable that the command signal includes a preceding command signal which is transmitted on ahead and a subsequent command signal which follows the preceding command signal, and the analyzer identifies at least one of the leading and terminal pulse signals based on an interval of the pulse signals in the command signal and a reception interval between the preceding and subsequent command signals.

According to the aforementioned configuration, the command signal includes the preceding command signal which is transmitted on ahead and the subsequent command signal which follows the preceding command signal. The analyzer identifies at least one of the leading and terminal pulse signals on the basis of the interval of the pulse signals in the command signal and the reception interval of the preceding and subsequent command signals. Therefore the optical filter portion may appropriately execute the assistance operation in response to the preceding and subsequent command signals.

An image system according to the embodiment comprises: a display device configured to alternately switch display of frame images of a video; and an eyeglass device configured to adjust a transmitted light amount to an eye of a viewer in synchronization with the display of the frame images to execute an assistance operation for assisting in stereoscopically viewing the video, wherein the display device includes: a display portion configured to display the video; a generator configured to generate a synchronization signal including a command signal which is synchronized with the display of the frame images of the video; and a transmitter configured to transmit the synchronization signal, the command signal includes a predetermined number of pulse signals, the command signal includes a leading pulse signal for notifying a start of the command signal, a terminal pulse signal for notifying an end of the command signal, and control pulse signals for notifying a content of the assistance operation which is synchronized with the display of the frame images, and the eyeglass device includes: an optical filter portion configured to execute the assistance operation; a receiver configured to receive the synchronization signal; an analyzer configured to analyze the synchronization signal; and a controller configured to control the optical filter portion based on an analysis result of the analyzer.

According to the aforementioned configuration, the display device alternately switches the display of the frame images of the video. The eyeglass device adjusts the transmitted light amount to the eye of the viewer in synchronization with the display of the frame images to execute the assistance operation for stereoscopically viewing the video. The generator of the display device generates the synchronization signal including a command signal which is synchronized with the display of the frame images of the video displayed by the display portion. The command signal includes the leading pulse signal for notifying the start of the command signal, the terminal pulse signal for notifying the end of the command signal, and the control pulse signals for notifying the content of the assistance operation which is synchronized with the display of the frame images. The analyzer analyzes the synchronization signal received by the receiver. The controller controls the optical filter portion which executes the assistance operation on the basis of the analysis result of the analyzer. Since a predetermined number of pulse signals are included in the command signal, the analyzer may easily identify a noise signal in the synchronization signal.

The principles according to the aforementioned embodiment may be applied to a display device such as a TV set, and an eyeglass device which is used for viewing a video displayed on the display portion.

The invention claimed is:

1. A display device, comprising:
a display portion configured to display a video;
a generator configured to generate a synchronization signal including a command signal which is synchronized with display of a frame image of the video; and
a transmitter configured to transmit the synchronization signal,
wherein the command signal has a predetermined number of pulse signals including a leading pulse signal for notifying a start of the command signal, a terminal pulse signal for notifying an end of the command signal, and control pulse signals for notifying a content of synchronization control which is synchronized with the display of the frame image,
a transmission interval between the leading and terminal pulse signals is determined as a constant value,
the control pulse signals includes a predetermined number of effective pulse signals,
the generator defines time-positions at constant time intervals between the leading pulse signal and the terminal pulse signal, and determines a combination of the time-positions as timings of the effective pulse signals in response to the content of the synchronization control, the combination of the timing positions being different for different content of respective synchronization controls, and
pulse widths of the respective effective pulse signals are equal to each other.

2. The display device according to claim 1, wherein
the synchronization control includes first synchronization control and second synchronization control which is different from the first synchronization control,
the command signal includes a first command signal for notifying a content of the first synchronization control, and a second command signal for notifying a content of the second synchronization control, and
the generator changes a combination of the time-positions determined as the timings of the effective pulse signals of the first command signal from the second command signal.

3. The display device according to claim 1, wherein
a preceding command signal and a subsequent command signal which follows the preceding command signal are used as the command signal, and
the transmitter intermittently transmits the preceding and subsequent command signals so that a time interval between the terminal pulse signal of the preceding command signal and the leading pulse signal of the subsequent command signal becomes different from a time interval of the pulse signals in the command signal.

4. An eyeglass device, comprising:
an optical filter portion which adjusts a transmitted light amount to an eye of a viewer in synchronization with display of a frame image of a video to execute an assistance operation for assisting in stereoscopically viewing the video;
a receiver configured to receive a synchronization signal for executing the assistance operation which is synchronized with the display of the frame image; and
a controller which analyzes the synchronization signal to control the optical filter portion based on an analysis result,
wherein the synchronization signal includes a command signal having a predetermined number of pulse signals,
the command signal includes a leading pulse signal for notifying a start of the command signal, a terminal pulse signal for notifying an end of the command signal, and control pulse signals for notifying a content of the assistance operation which is synchronized with the display of the frame image, a transmission interval between the leading and terminal pulse signals is determined as a constant value, the control pulse signals includes a predetermined number of effective pulse signals, the controller defines time-positions at constant time intervals between the leading pulse signal and the terminal pulse signal, determines a combination of the time-positions as timings of the effective pulse signals in response to the content of the synchronization control, the combination of the timing positions being different for different content of respective synchronization controls, and determines a pulse signal as noise unless a timing of the pulse signal matches any one of the time-positions, and pulse widths of the respective effective pulse signals are equal to each other.

5. The eyeglass device according to claim 4, wherein the controller determines whether a signal received by the receiver is the command signal used for controlling the optical filter portion based on a reception interval between the leading and terminal pulse signals.

6. The eyeglass device according to claim 4, wherein the controller determines whether the signal received by the receiver is the command signal used for controlling the optical filter portion based on a number of pulse signals between the leading and terminal pulse signals.

7. The eyeglass device according to claim 4, wherein the controller determines whether a signal received by the receiver is the command signal used for controlling the optical filter portion based on the time-positions.

8. The eyeglass device according to claim 4, wherein the controller determines a control content for the optical filter portion based on an arrangement pattern of the effective pulse signals placed at a part of the time-positions.

9. The eyeglass device according to claim 4, wherein a first command signal for causing the optical filter portion to execute a first adjustment operation for adjusting the transmitted light amount, and a second command signal for causing the optical filter portion to execute a second adjustment operation, which is different from the first adjustment operation, are used as the command signal, and the controller determines whether a signal received by the receiver is the command signal used for controlling the optical filter portion based on a reception cycle of at least one of the first and second command signals.

10. The eyeglass device according to claim 4, wherein a preceding command signal which is transmitted on ahead and a subsequent command signal which follows the preceding command signal are used as the command signal, and the controller identifies at least one of the leading and terminal pulse signals based on an interval of the pulse signals in the command signal and a reception interval between the preceding and subsequent command signals.

11. An image system, comprising:

a display device configured to alternately switch display of frame images of a video; and an eyeglass device configured to adjust a transmitted light amount to an eye of a viewer in synchronization with the display of the frame images to execute an assistance operation for assisting in stereoscopically viewing the video, wherein the display device includes:

a display portion configured to display the video;

a generator configured to generate a synchronization signal including a command signal which is synchronized with the display of the frame images of the video; and a transmitter configured to transmit the synchronization signal, the command signal has a predetermined number of pulse signals including a leading pulse signal for notifying a start of the command signal, a terminal pulse signal for notifying an end of the command signal, and control pulse signals for notifying a content of the assistance operation which is synchronized with the display of the frame images, and the eyeglass device includes:

an optical filter portion configured to execute the assistance operation;

a receiver configured to receive the synchronization signal; and a controller which analyzes the synchronization signal to control the optical filter portion based on an analysis result, a transmission interval between the leading and terminal pulse signals is determined as a constant value, the control pulse signals includes a predetermined number of effective pulse signals, the controller defines time-positions at constant time intervals between the leading pulse signal and the terminal pulse signal, determines a combination of the time-positions as timings of the effective pulse signals in response to the content of the synchronization control, the combination of the timing positions being different for different content of respective synchronization controls, and determines a pulse signal as noise unless a timing of the pulse signal matches any one of the time-positions, and pulse widths of the respective effective pulse signals are equal to each other.

* * * * *